United States Patent
Tseng et al.

(10) Patent No.: US 11,323,938 B2
(45) Date of Patent: May 3, 2022

(54) METHODS AND APPARATUSES FOR SL CARRIER AGGREGATION ENHANCEMENT

(71) Applicant: FG Innovation Company Limited, Tuen Mun (HK)

(72) Inventors: Yung-Lan Tseng, Taipei (TW); Hung-Chen Chen, Taipei (TW); Mei-Ju Shih, Taipei (TW); Yu-Hsin Cheng, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 17/091,582

(22) Filed: Nov. 6, 2020

(65) Prior Publication Data
US 2021/0136646 A1 May 6, 2021

Related U.S. Application Data

(60) Provisional application No. 62/931,401, filed on Nov. 6, 2019.

(51) Int. Cl.
*H04W 4/40* (2018.01)
*H04W 36/14* (2009.01)
*H04W 36/00* (2009.01)
*H04W 88/06* (2009.01)
*H04W 48/18* (2009.01)

(52) U.S. Cl.
CPC ............. *H04W 36/14* (2013.01); *H04W 4/40* (2018.02); *H04W 36/0088* (2013.01); *H04W 48/18* (2013.01); *H04W 88/06* (2013.01)

(58) Field of Classification Search
CPC ... H04W 36/14; H04W 36/0088; H04W 4/40; H04W 88/06; H04W 48/18; H04W 36/0072; H04W 48/16; H04W 48/12; H04W 4/46; H04W 92/18; H04W 76/14;
(Continued)

(56) References Cited

U.S. PATENT DOCUMENTS

| 10,356,738 B2 * | 7/2019 | Lee ........................ H04W 92/18 |
| 2020/0045674 A1 * | 2/2020 | Tseng ..................... H04W 76/14 |

(Continued)

FOREIGN PATENT DOCUMENTS

| CN | 107534828 A | 1/2018 |
| CN | 109246659 A | 1/2019 |

(Continued)

*Primary Examiner* — Marcus Hammonds
(74) *Attorney, Agent, or Firm* — ScienBiziP, P.C.

(57) ABSTRACT

A user equipment (UE) includes one or more non-transitory computer-readable media containing computer-executable instructions embodied therein and at least one processor coupled to the one or more non-transitory computer-readable media. The at least one processor is configured to receive through a serving cell of a first Radio Access Technology (RAT), a sidelink resource configuration of a second RAT, determine first validity area information associated with the first RAT and second validity area information associated with the second RAT, the first validity area information and the second validity area information being associated with different frequency carriers, and identify a validity area of the sidelink resource configuration based on the first validity area information and the second validity area information.

20 Claims, 7 Drawing Sheets

(58) Field of Classification Search
CPC ............. H04W 72/0406; H04L 5/0048; H04L 5/0091; H04L 5/001
See application file for complete search history.

(56) References Cited

U.S. PATENT DOCUMENTS

| | | | |
|---|---|---|---|
| 2020/0107236 A1* | 4/2020 | Tseng .................... | H04W 76/27 |
| 2020/0163005 A1* | 5/2020 | Rao ....................... | H04W 76/14 |
| 2020/0305055 A1* | 9/2020 | Basu Mallick ......... | H04W 4/40 |
| 2020/0336872 A1* | 10/2020 | Basu Mallick ....... | H04W 4/023 |
| 2021/0045093 A1* | 2/2021 | Rao ....................... | H04W 72/04 |

FOREIGN PATENT DOCUMENTS

| | | |
|---|---|---|
| CN | 109479292 A | 3/2019 |
| CN | 109845373 A | 6/2019 |

\* cited by examiner

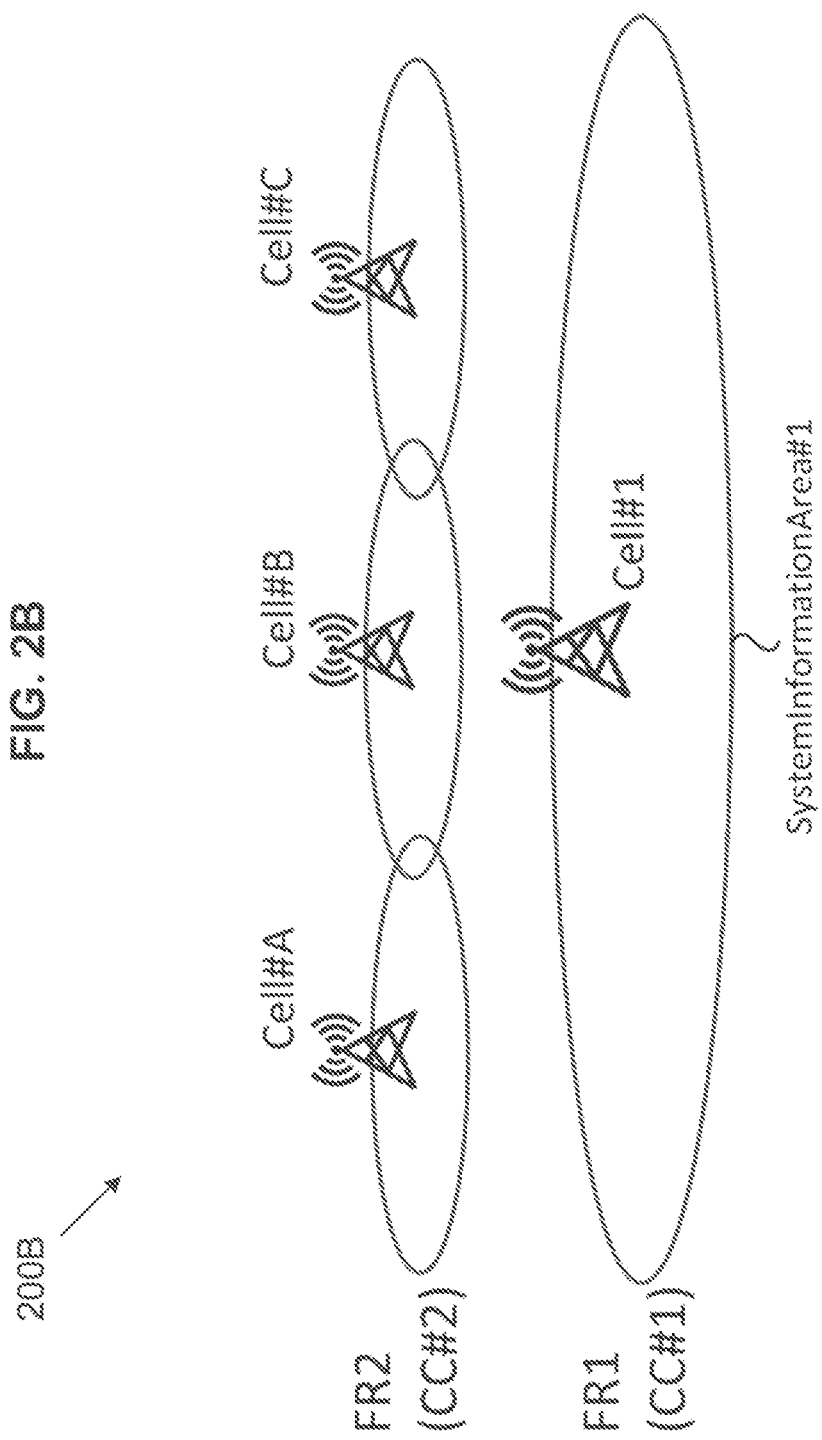

METHODS AND APPARATUSES FOR SL CARRIER AGGREGATION ENHANCEMENT

CROSS-REFERENCE TO RELATED APPLICATION(S)

The present disclosure claims the benefit of and priority of provisional U.S. Patent Application Ser. No. 62/931,401, filed on Nov. 6, 2019, entitled "SL Carrier Aggregation Enhancement" ("the '401 provisional"). The disclosure of the '401 provisional is hereby incorporated fully by reference into the present disclosure for all purposes.

FIELD

The present disclosure is related to wireless communication, and more particularly, to methods and apparatuses for sidelink (SL) carrier aggregation enhancement in wireless communication networks.

BACKGROUND

With the tremendous growth in the number of connected devices and the rapid increase in user/network traffic volume, various efforts have been made to improve different aspects of wireless communication for cellular wireless communication systems, such as fifth generation (5G) New Radio (NR), by improving data rate, latency, reliability and mobility.

The 5G NR system is designed to provide flexibility and configurability to optimize the network services and types, accommodating various use cases such as Vehicle to Vehicle (V2V), Vehicle to Pedestrian (V2P), and Vehicle to Everything (V2X) communications.

However, as the demand for radio access continues to increase, there exists a need for further improvements in the art.

SUMMARY

The present disclosure is related to methods and apparatuses for SL carrier aggregation enhancement in wireless communication networks.

According to a first aspect of the present disclosure, a user equipment (UE) includes one or more non-transitory computer-readable media containing computer-executable instructions embodied therein and at least one processor coupled to the one or more non-transitory computer-readable media. The at least one processor is configured to receive through a serving cell of a first Radio Access Technology (RAT), a sidelink resource configuration of a second RAT, determine first validity area information associated with the first RAT and second validity area information associated with the second RAT, the first validity area information and the second validity area information being associated with different frequency carriers, and identify a validity area of the sidelink resource configuration based on the first validity area information and the second validity area information.

In an implementation of the first aspect, the at least one processor is further configured to execute the computer-executable instructions to access a sidelink resource associated with the validity area after the validity area is identified as valid.

In another implementation of the first aspect, the first validity area information is associated with a first Public Land Mobile Network (PLMN) identity (PLMNidentity) in a PLMNidentity list or a first Non-Public Network (NPN) identity (NPNidentity) in a NPNidentity list, and the PLMNidentity list and the NPNidentity list are broadcast by the serving cell.

In yet another implementation of the first aspect, the second validity area information is associated with at least one of one or more SL transmission resource pools, one or more SL reception resource pools, one or more (Type1/Type2) sidelink configured grant, and one or more exceptional transmission resource pools.

In yet another implementation of the first aspect, the first RAT is a $5^{th}$ Generation New Radio (5G NR) RAT.

In yet another implementation of the first aspect, NR sidelink communication is considered as part of the 5G NR RAT (or is associated with the 5G NR RAT).

In yet another implementation of the first aspect the NR sidelink communication is implemented based on the 5G NR RAT.

In yet another implementation of the first aspect, the second RAT is an Evolved Universal Terrestrial Radio Access (E-UTRA) RAT.

In yet another implementation of the first aspect, the sidelink resource configuration of the second RAT is for Long Term Evolution (LTE) Vehicle to Everything (V2X) sidelink communication associated with an Evolved Universal Terrestrial Radio Access (E-UTRA) RAT.

In yet another implementation of the first aspect, V2X sidelink communication and sidelink communication/discovery are considered as part of the E-UTRA RAT (or are associated with the E-UTRA RAT).

In yet another implementation of the first aspect, V2X sidelink communication and sidelink communication/discovery are implemented based on the E-UTRA RAT.

In yet another implementation of the first aspect, the sidelink resource configuration of the second RAT (e.g., V2X sidelink communication) is received through system information broadcast by the serving cell of the first RAT.

In yet another implementation of the first aspect, the sidelink resource configuration of the first RAT (e.g., NR sidelink communication) is received through system information broadcast by the serving cell of the second RAT.

In yet another implementation of the first aspect, the validity area of the sidelink resource configuration is composed of at least one system information area identifier (systemInformationAreaID) broadcast by the serving cell of the first RAT.

In yet another implementation of the first aspect, the first validity area of the first RAT is composed by the serving cell of the first RAT, when the systemInformationAreaID is absent or when the sidelink resource configuration is not indicated by the systemInformationAreaID broadcast by the serving cell.

In yet another implementation of the first aspect, the sidelink resource configuration associated with the validity area is invalidated by the UE after the UE moves out of either a first validity area associated with the first validity area information and/or a second validity area associated with the second validity area information.

According to a second aspect of the present disclosure, a method performed by a UE is provided. The method includes receiving, through a serving cell of a first Radio Access Technology (RAT), a sidelink resource configuration of a second RAT, determining first validity area information associated with the first RAT and second validity area information associated with the second RAT, the first validity area information and the second validity area information being associated with different frequency carriers, and identifying a validity area of the sidelink resource configuration based on the first validity area information and the second validity area information.

In an implementation of the second aspect, the method further includes accessing a sidelink resource associated with the validity area after the validity area is identified as valid.

In another implementation of the second aspect, the first validity area information is associated with a first Public Land Mobile Network (PLMN) identity (PLMNidentity) in a PLMNidentity list or a first Non-Public Network (NPN) identity (NPNidentity) in a NPNidentity list, and the PLMNidentity list and the NPNidentity list are broadcast by the serving cell.

In yet another implementation of the second aspect, after cell (re)selection procedures triggered by an UE mobility event, the UE may also check the first validity area information by checking whether the first PLMN identity (or the first NPN identity) of the serving cell has changed. Moreover, the UE may check the first PLMN identity (in the PLMNidentity list broadcast by the serving cell) while the UE is checking the validity of the first validity area information and the UE is not under the Stand-alone Non-Public Network (SNPN) access mode. On the other hand, the UE may check the first NPN identity (in the NPNidentity list broadcast by the serving cell) while the UE is checking the validity of the first validity area information and the UE is under the SNPN access mode.

In yet another implementation of the second aspect, the second validity area information is associated with at least one of one or more SL transmission resource pools, one or more SL reception resource pools, one or more exceptional transmission resource pools, and one or more (Type1/Type2) sidelink configured grants.

In yet another implementation of the second aspect, the first RAT is a 5$^{th}$ Generation New Radio (5G NR) RAT.

In yet another implementation of the second aspect, the second RAT is an Evolved Universal Terrestrial Radio Access (E-UTRA) RAT.

In yet another implementation of the second aspect, the sidelink resource configuration of the second RAT (e.g., a V2X sidelink resource configuration associated with the E-UTRA RAT) is received through system information broadcast by the serving cell of the first RAT (e.g., an NR Cell).

In yet another implementation of the second aspect, the validity area of the sidelink resource configuration is composed of at least one system information area identifier (systemInformationAreaID) broadcast by the serving cell of the first RAT.

In yet another implementation of the second aspect, the first validity area of the first RAT is composed by the serving cell of the first RAT, when the systemInformationAreaID is absent or when the sidelink resource configuration is not indicated by the systemInformationAreaID broadcast by the serving cell.

In yet another implementation of the second aspect, the sidelink resource configuration associated with the validity area is invalidated by the UE after the UE moves out of either a first validity area associated with the first validity area information or a second validity area associated with the second validity area information.

BRIEF DESCRIPTION OF THE DRAWINGS

Aspects of the disclosure are best understood from the following detailed description when read with the accompanying drawings. Various features are not drawn to scale. Dimensions of various features may be arbitrarily increased or reduced for clarity of discussion.

FIG. 2A and FIG. 2B are diagrams illustrating carrier aggregation for (LTE) V2X SL communication/NR SL communication, in accordance with example implementations of the present disclosure.

DESCRIPTION

Figure 1:
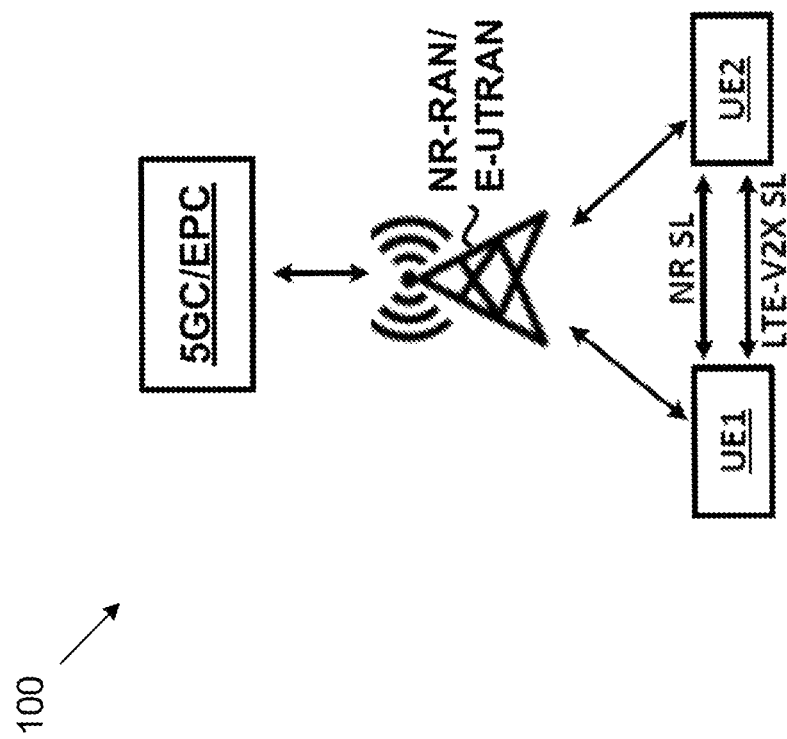
FIG. 1 is a diagram illustrating LTE/NR (V2X) SL operations, in accordance with an example implementation of the present disclosure.

The following description contains specific information related to implementations of the present disclosure. The drawings and their accompanying detailed description are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not illustrated) by the same numerals in the drawings. However, the features in different implementations may be differed in other respects and shall not be narrowly confined to what is illustrated in the drawings.

The phrases "in one implementation," or "in some implementations," may each refer to one or more of the same or different implementations. The term "coupled" is defined as connected whether directly or indirectly through intervening components and is not necessarily limited to physical connections. The term "comprising" means "including, but not necessarily limited to" and specifically indicates open-ended inclusion or membership in the so-described combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for describing associated objects and represents that three relationships may exist such that A and/or B may indicate that A exists alone, A and B exist at the same time, or B exists alone. The character "/" generally represents that the associated objects are in an "or" relationship.

For the purposes of explanation and non-limitation, specific details such as functional entities, techniques, protocols, and standards are set forth for providing an understanding of the disclosed technology. In other examples, detailed description of well-known methods, technologies, systems, and architectures are omitted so as not to obscure the description with unnecessary details.

Persons skilled in the art will immediately recognize that any network function(s) or algorithm(s) disclosed may be implemented by hardware, software or a combination of software and hardware. Disclosed functions may correspond to modules which may be software, hardware, firmware, or any combination thereof.

A software implementation may include computer-executable instructions stored on a computer-readable medium such as memory or other types of storage devices. One or more microprocessors or general-purpose computers with communication processing capability may be programmed with corresponding executable instructions and perform the disclosed network function(s) or algorithm(s).

The microprocessors or general-purpose computers may include Applications Specific Integrated Circuitry (ASIC), programmable logic arrays, and/or using one or more Digital Signal Processor (DSPs). Although some of the disclosed implementations are oriented to software installed and executing on computer hardware, alternative implementations implemented as firmware or as hardware or as a combination of hardware and software are well within the scope of the present disclosure. The computer readable medium includes but is not limited to Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more BSs.

A UE may include but is not limited to a mobile station, a mobile terminal or device, or a user communication radio terminal. The UE may be a portable radio equipment that includes but is not limited to a mobile phone, a tablet, a wearable device, a sensor, a vehicle, or a Personal Digital Assistant (PDA) with wireless communication capability. The UE is configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include but is not limited to a node B (NB) in the UMTS, an evolved node B (eNB) in LTE or LTE-A, a radio network controller (RNC) in UMTS, a BS controller (BSC) in the GSM/GERAN, an ng-eNB in an Evolved Universal Terrestrial Radio Access (E-UTRA) BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage.

Each cell (often referred to as a serving cell) provides services to serve one or more UEs within its radio coverage such that each cell schedules the DL and optionally uplink (UL) resources to at least one UE within its radio coverage for DL and optionally UL packet transmissions. The BS can communicate with one or more UEs in the radio communication system via the plurality of cells.

A cell may allocate SL resources for supporting Proximity Service (ProSe), sidelink service (e.g., (LTE) sidelink communication service and/or (LTE) sidelink discovery service) or Vehicle to Everything (V2X) service (e.g., NR sidelink communication and/or (LTE) V2X sidelink communication). Each cell may have overlapped coverage areas with other cells.

As discussed previously, the frame structure for NR supports flexible configurations for accommodating various next generation (e.g., 5G) communication requirements such as Enhanced Mobile Broadband (eMBB), Massive Machine Type Communication (mMTC), and Ultra-Reliable and Low-Latency Communication (URLLC), while fulfilling high reliability, high data rate and low latency requirements. The Orthogonal Frequency-Division Multiplexing (OFDM) technology in the 3rd Generation Partnership Project (3GPP) may serve as a baseline for an NR waveform. The scalable OFDM numerology such as adaptive sub-carrier spacing, channel bandwidth, and Cyclic Prefix (CP) may also be used.

Two coding schemes are considered for NR, specifically Low-Density Parity-Check (LDPC) code and Polar Code. The coding scheme adaption may be configured based on channel conditions and/or service applications.

When a transmission time interval (TTI) of a single NR frame includes DL transmission data, a guard period, and UL transmission data, the respective portions of the DL transmission data, the guard period, and the UL transmission data may be configured based on the network dynamics of NR. SL resources may also be provided in an NR frame to support ProSe services or V2X services.

Example description of some selected terms used in this disclosure are given below.

Primary Cell (PCell): For dual connectivity (DC) operation or carrier aggregation (CA) operation, PCell is the master cell group (MCG) cell, operating on the primary frequency, in which the UE either performs the initial connection establishment procedure or initiates the connection re-establishment procedure.

Primary SCG Cell (PSCell): For DC operation, PSCell is the secondary cell group (SCG) cell in which the UE performs random access when performing the Reconfiguration with Sync procedure.

Special Cell: For DC operation the term Special Cell (SpCell) refers to the PCell of the MCG or the PSCell of the SCG, otherwise (e.g., for CA operation), the term Special Cell refers to the PCell.

Secondary Cell: For a UE configured with carrier aggregation (CA), a cell providing additional radio resources on top of Special Cell.

Serving Cell: For a UE in RRC_CONNECTED not configured with CA/DC, there is only one serving cell, which may be referred to as the primary cell. For a UE in RRC_CONNECTED configured with CA/DC, the term "serving cells" may be used to denote the set of cells including the SpCell(s) and all secondary cells.

Listen Before Talk (LBT) is a feature available in Wi-Fi that allows coexistence with other Wi-Fi nodes. LBT is a mechanism by which an equipment applies clear channel assessment (CCA) before using the channel. The 3rd Generation Partnership Project (3GPP) chose to specify a conservative LBT scheme similar to what Wi-Fi nodes use in order to ensure coexistence of Licensed Assisted Access (LAA) with Wi-Fi. LAA uses carrier aggregation in DL to combine LTE in the unlicensed spectrum (e.g., 5 GHz) with LTE in the licensed band. In NR, LBT may be also required prior to any transmission when operating on the unlicensed spectrum.

In the present disclosure, various implementations focus on the functionality of NR cells to support SL operation under SL carrier aggregation. In the present disclosure, both Frequency Range 1 (FR1) and Frequency Range 2 (FR2) may be considered to support (NR-V2X) SL operations. The UE may require additional power to support SL operations, such as SL synchronization, sidelink resource (pools) configuration, and SL (serving/non-serving) cell (re)selection cross multiple SL component carriers. In an effort to reduce power consumption by the UE supporting these SL operations, various implementations of the present disclosure provide, among other things, a cross-carrier validity area configuration in an SL resource configuration, as discussed in IMPLEMENTATION 1 of the present disclosure. Moreover, various implementations of the present disclosure provide, among other things, fallback mechanisms when a cross-carrier validity area configuration is absent, as discussed in IMPLEMENTATION 2 of the present disclosure.

In various implementations of the present disclosure, to maintain channel quality (e.g., beam management) in FR2, a range-based SL resource association is provided to enable an SL logical channel (LCH) to be associated with different combinations of SL component carrier(s), (so to be the SL resource configuration on these configured SL components) based on the distance (e.g., physical distance) between the UEs (e.g., transmission (Tx)/reception (Rx) UEs), as discussed in IMPLEMENTATION 2 of the present disclosure.

Under an SL carrier aggregation scenario, in some implementations of the present disclosure, an NRNon-standalone (NSA) cell may not support LTE/NR SL operations. In addition, the UE may not attempt to decode the system information broadcast by an NR NSA cell (e.g., SIB1) to obtain system information about SL resource configuration for LTE V2X sidelink (communication) services and NR V2X services/NR sidelink (communication) service (e.g., the NSA cell is not a suitable cell to the UE and the UE can not access V2X services if the UE is in a limited service state). In some implementations of the present disclosure, some component carriers may be deployed with NR NSA cells. As a result, the UE may select to camp on an NR NSA cell. For example, the UE may be in a 'camped on any cell' state, and the camped NSA cell is an 'acceptable cell' to the UE. However, these NSA cells may still support NR/LTE SL operations and these NSA cells can still broadcast one or more SL configurations in system information to the UEs. The UEs may be in a limited service state and able to access (public safety) V2X service(s) or public safety related SL service(s). IMPLEMENTATION 3 of the present disclosure describes how an NR NSA cell supports NR/LTE SL operations.

In addition, with the introduction of FR2 for SL carrier aggregation, implementations of the present disclosure provide assistance information regarding how channel quality or packet delivery status may be delivered by the component carriers in FR1. As discussed below, IMPLEMENTATION 4 of the present disclosure provides support for 'FR2 assistance information exchange' on FR1. In the present disclosure, the range of FR1 may be specified to the SL component carriers in a lower frequency range (e.g., less than 7 GHz), and the range of FR2 may be specified to the SL component carriers in a higher frequency range (e.g., greater than equal to 7 GHz). Implementations of the present disclosure may be applicable to SL unicast group scenarios, SL multi-cast/group-cast group scenarios, and SL broadcast scenarios. In addition, implementations of the present disclosure may be applicable to public-safety V2X services, non-public safety (e.g., commercial) V2X services, and (public-safety/non-public-safety) SL communication/discovery services.

IMPLEMENTATION 5 of the present disclosure provides stored validity area and SL resource configuration cross serving frequency(ies) and non-serving frequency(ies) while cell (re)selection may be implemented on the serving frequency(ies) and non-serving frequency(ies).

Implementation 1: Cross-Carrier Validity Area Configuration

Referring to FIG. 1, FIG. 1 is a diagram 100 illustrating V2X SL operations, in accordance with an example implementation of the present disclosure. In FIG. 1, at least two UEs (e.g., UE1 and UE2) may be configured in an (Access Stratum (AS)-layer/Non-Access Stratum (NAS)) unicast group to implement NR-SL (which is also referred to as NR-V2X in some applications) services and/or LTE-V2X (sidelink) services based on configured NR and/or LTE SL configurations (e.g., the NR SL configuration and LTE V2X configuration). It should be noted that, in some implementations, the LTE V2X services may include the LTE V2X communication through an LTE Uu interface (e.g., packets exchange through downlink/uplink direction between the UE(s) and serving Radio Access Network) and/or the LTE V2X SL packets exchange (e.g., LTE V2X SL communication and/or LTE V2X SL discovery between UEs) through an LTE PC5 interface. Thus, in some implementations, the LTE V2X configuration may include the configuration for LTE V2X communication through the LTE Uu interface and/or the configuration for LTE V2X SL communication/LTE V2X SL discovery through the LTE PC5 interface (e.g., LTE V2X SL configuration). It should also be noted that, in some implementations, the NR SL service may include NR SL packet exchange (e.g., NR SL communication and/or NR SL discovery between UEs) through an NR PC5 interface. Therefore, in some implementations, the NR SL configuration may include the configuration for NR SL communication and/or NR SL discovery. Furthermore, the NR SL communication may include NR SL transmission (e.g., one UE transmits NR SL packets and/or SL NR control messages (e.g., SL Control Information (SCI) and/or PC5 Radio Resource Control (RRC signaling and/or SL Hybrid Automatic Repeat reQuest (HARQ) Acknowledgement/Non-Acknowledgement messages) and/or NR SL synchronization signals (NR SL synchronization burst sets) to nearby UEs in the same NR SL unicast/multi-cast (group-cast)/broadcast groups) and/or NR SL reception (e.g., one UE receives NR SL packets and/or NR SL control messages (e.g., SCI or PC5 RRC signaling) and/or NR SL synchronization signals (NR SL synchronization burst sets) to nearby UEs in the same NR SL unicast/Multi-cast(group-cast)/broadcast groups).

In various implementations of the present disclosure, the serving cell (e.g., an NR cell in FIG. 1) may configure multiple SL CCs and the associated RATs (or associated RANs) in the corresponding SL CCs. In accordance with an example implementation of the present disclosure, with reference to FIG. 1, at least two UEs (e.g., UE 1 and UE 2) may be configured in an (Access Stratum (AS)-layer/Non-Access Stratum (NAS)) multi-cast group to implement NR-SL (which is also referred to as NR-V2X (sidelink) in some applications) services and/or LTE-V2X (sidelink) services based on configured NR and/or LTE SL configurations. In various implementations of the present disclosure, the serving cell (e.g., an NR cell in FIG. 1) may configure multiple SL CCs and the associated RATs (or associated RANs) in the corresponding SL CCs. In accordance with an example implementation of the present disclosure, with reference to FIG. 1, at least two UEs (e.g., UE1 and UE2) may be configured in an AS-layer/NAS layer) broadcast group to implement NR-SL (which is also referred to as NR-V2X in some applications) services and/or LTE-V2X services based on configured NR and/or LTE SL configurations. In various implementations of the present disclosure, the serving cell (e.g., an NR cell in FIG. 1) may configure multiple SL CCs and the associated RATs (or associated RANs) in the corresponding SL CCs. It should be noted that, in some implementations, the UEs in one unicast group/multi-cast group/broadcast group may be served by one or more cells, which may be served by one or more RATs (e.g., New Radio, E-UTRA). In some other implementations, one or more UEs in the unicast group/multi-cast group/broadcast group may be out of the coverage of cellular networks (e.g., the UE(s) could not find out at least one cell which the downlink reference signaling quality, such as the DLRefrence SgaRceive Power (RSRP), is higher than a pre-defined threshold). In addition, one out-of-coverage UE may communicate with other UEs in the same unicast/multi-cast/broadcast group based on SL-pre-configuration or configurations obtained from the neighboring UEs (e.g., through SL-Master Information Block (MIB) reception or PC5 RRC signaling exchange or PC5-S signaling). A UE may join in one or more unicast/multi-cast/broadcast group(s) and each group may be associated with one Layer 2 Identifier independently.

The ProSe (Proximity Service) unicast group (or SL unicast group in the AS-layer) may be in-coverage, partial-coverage, or out-of-coverage with a serving RAN, that is an NR RAN connected to a 5GC (5G Core) and/or a Evolved Packet Core (EPC) as shown in FIG. 1. In another implementation, the ProSe unicast group (or SL unicast group in the AS-layer) may be in-coverage, partial-coverage, or out-of-coverage with a serving RAN, that is an E-UTRAN (Evolved Universal Terrestrial Radio Access Network) connected to an EPC (Evolved Packet Core) and/or an 5GC (5G Core).

In FIG. 1, a (NR) gNB in an NR-RAN (or a LTE eNB in an E-UTRAN) may provide physical resource(s) to support NR-V2X SL operation(s) and/or LTE-V2X SL operation(s). The interface between UE1 and UE 2 to support NR-V2X SL operation(s) is referred to as an NR PC5 interface. For example, an NR PC5 interface may be configured by a serving RAN (e.g., an NR-RAN or an E-UTRAN) or by pre-configuration, which may be stored in the memory modules or USIMs (UMTS Subscriber Identity Modules) of the UEs, to support NR V2X service(s). The interface between the vehicles to support LTE-V2X SL operation(s) is referred to as an LTE PC5 interface. The LTE PC5 interface may be configured by the serving RAN (e.g., an NR-RAN or an E-UTRAN) or by pre-configuration, which is stored in the memory module(s) or USIM(s) (UMTS Subscriber Identity Module(s)) of the UEs, to support LTE V2X service(s). In some implementations, the serving NR cell is the PCell (primary cell) to the UE. In some implementations, the serving NR cell may be the PSCell (primary SCell) to the UE(s) while the UE(s) is/are configured with an additional secondary node based on an NR dual-connectivity (or multi-connectivity) configuration. In addition, the serving PSCell may transmit SL resource configuration to the UE(s) directly through a configured radio bearer (e.g., SRB3). It should be noted that, in the implementations of the present disclosure, the serving RAN is not limited to an NR RAN. For example, the serving RAN may be an E-UTRAN. In addition, implementations of the present disclosure may cover both an intra-RAT SL resource configuration (e.g., an NR cell may provide an NR SL resource configuration and an LTE cell may provide an LTE (V2X) SL resource configuration) and an inter-RAT SL resource configuration (e.g., an NR cell may provide an LTE SL resource configuration and an LTE cell may provide an NR SL resource configuration).

Figure 2A:
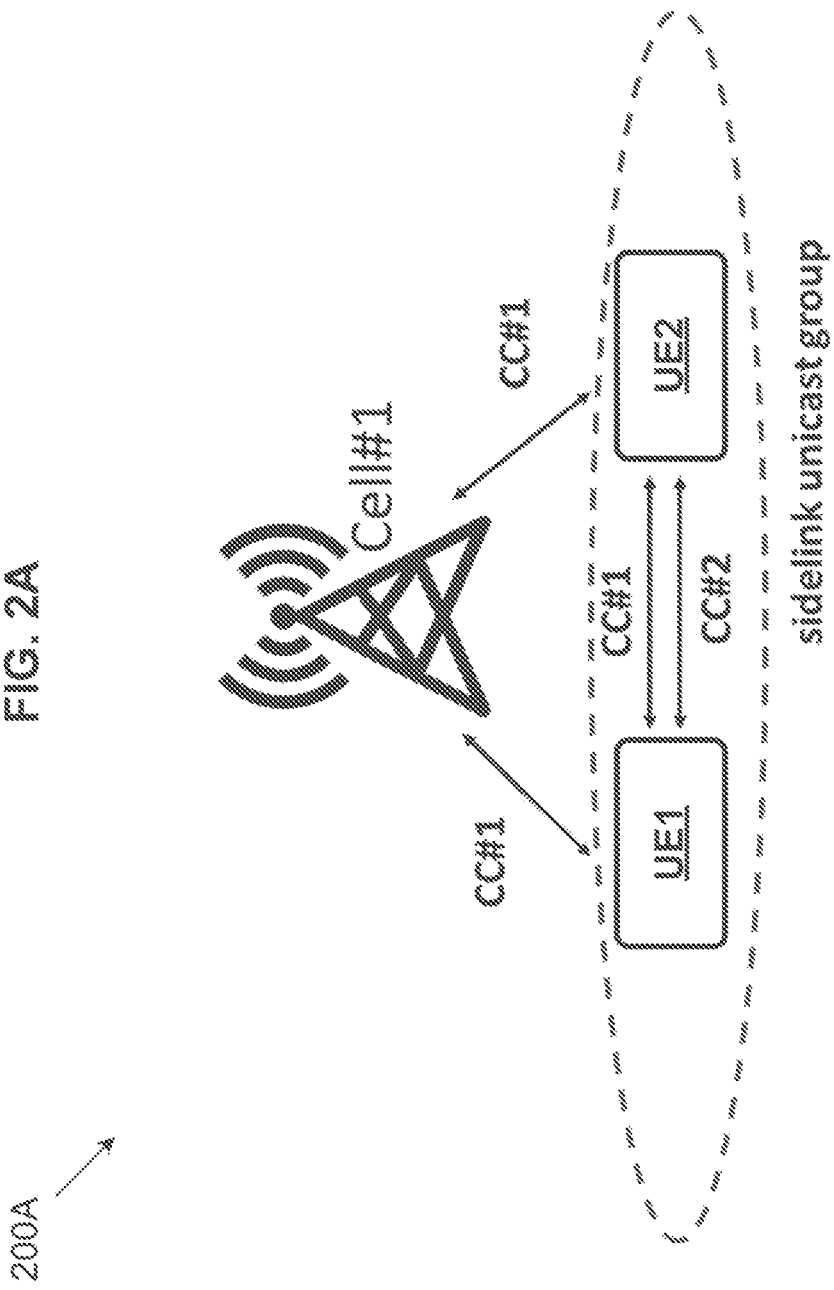

Referring to FIGS. 2A and 2B, FIGS. 2A and 2B are diagrams illustrating V2X SL carrier aggregation, in accordance with example implementations of the present disclosure. As shown in diagram 200A in FIG. 2A, one or more UEs (e.g., UE1 and UE2) may be served by a serving cell (Cell #1) via an SL component carrier (e.g., CC #1). As shown in diagram 200B in FIG. 2B, Cell #1 is deployed in CC #1, where is in FR1. Also shown in diagram 200B, There are several cells (Cell #A, Cell #B, and Cell #C) deployed in another SL component carrier (e.g., CC #2). In one example, CC #2 is in FR2. Both CC #1 and CC #2 support (NR/LTE) SL operation(s). In addition, CC #2 may have a paired DL frequency carrier (e.g., also in FR2) in Cell #A, Cell #B, Cell #C in the (LTE/NR) Uu interface. It should be noted that CC #1/CC #2 may or may not be the secondary frequency carrier to the UE(s) while the UE(s) is configured with carrier aggregation in an (LTE/NR) Uu interface. Furthermore, in some additional implementations, CC #1/CC #2 may or may not be the serving frequency carrier to the UE(s) while the UE(s) is implementing SL operations with non-serving cell(s), which are operating on the non-serving frequency carrier.

In the present disclosure, Cell #1 may configure an SL resource configuration indicating CC #2 to the UE(s) (e.g., UE1 and UE2) with a cross-carrier validity area configuration. In addition, the UE(s) may not need to perform SL synchronization and SL cell (re)selection on the associated SL frequency carrier of CC #2. The UE(s) may not be configured with special cell(s) and secondary cell(s) in the concerned frequency carrier. In other words, the concerned CC #2 is neither a primary frequency carrier nor a secondary frequency carrier to the UEs. In some implementations, the serving cell (e.g., Cell #1 in FIG. 2) may transmit timing adjustment instructions (e.g., timing advance instructions) to the UE(s) to adjust their transmission timing(s) based on the instructions from the serving cell.

In comparison, in LTE V2X protocols, SL resources among multiple SL carriers may be configured through a v2x-InterFreqInfoList (e.g., by broadcasting system information or by dedicated RRC signaling on a Uu interface). It should be noted that, in some implementations, the UE(s) may need to implement SL synchronization and SL cell (re)selection on the concerned frequency (or on the paired DL frequency carrier with the one used to transmit V2X SL communication), while the concerned frequency carrier is not a serving frequency to the UE(s). In some other implementations, the UE(s) may be optionally configured with a SyncFreqList, which specifies a list of candidate SL synchronization carrier frequencies for V2X SL communications on these non-serving frequency carriers. Additional SL synchronization may require additional power consumption by the UE(s).

In the implementations of the present disclosure, as shown in FIG. 2A, Cell #1 may deliver an SL resource configuration associated with CC #2 (and the cross-carrier validity area configuration) to the UE(s) through control signaling (e.g., by broadcasting system information or (UE-specific) dedicated RRC signaling). In addition, the associated validity area may be composed by cells in CC #1 and Cell #1 may also locate in the given validity area. In some implementations, the validity area may be composed by one or more cell identity(ies), physical cell identity(ies), systemInformationAreaID(s), RAN notification Area Code(s) or Tracking Area Code(s), etc. The cells in CC #1 may also deliver the assistance information (e.g., cell identity(ies), physical cell identity(ies), systemInformationAreaID(s), RAN notification Area Code(s), Tracking Area Code(s), and/or zone ID(s) which the cell belongs to) for the UE(s) to identify the range of the validity area.

Based on the associated validity area configuration, the UE(s) may transmit SL packet(s) on CC #2 directly without implementing SL synchronization or SL cell (re)selection on CC #2 (or the DL frequency carrier associated with CC #2). The UE(s) may transmit SL packets on CC #2 based on the timing reference which the UE(s) obtains from CC #1. In addition, the UE(s) may not need to use the DL frequency carrier associated with CC #2 in the LTE/NR Uu interface (which may also be the operating DL frequency carrier of Cell #A, Cell #B, and/or Cell #C) as the timing reference when the UE(s) is/are transmitting SL packets on CC #2. In some additional implementations, the UE may still implement sidelink synchronization and/or (non-serving) cell (re) selection on the CC #2. However, the UE may only need to check whether the selected cell on CC #2 is located on the sidelink resource validity area based on the pre-stored validity area information associated with CC #2 (e.g., the UE may receive the MIB and/or System information block Type1 (SIB1) of the selected cell after the cell (re)selection procedure (e.g., for cell identity reception and/or system information area ID reception, which may be broadcast by the selected cell in the MIB/SIB1). Then, the UE may check the validity of stored sidelink resource configuration based on the received cell identity/system information area ID broadcast by the selected cell and the stored validity area information associated with the stored sidelink resource configuration. However, the UE may not need to monitor the other system information or broadcasting control signaling broadcast by the selected cell for sidelink resource configuration reception) while the stored sidelink resource configuration is still valid.

In some implementations, Cell #1 (e.g., an NR cell) may support both a normal uplink (NUL) carrier and at least one supplementary uplink (SUL) carrier. In addition, Cell #1 may provide SL resource configurations in both the NUL carrier and SUL carrier(s). For example, at least one SL Bandwidth Part (BWP) configuration is associated with the NUL carrier, and at least one SL BWP configuration is associated with the SUL carrier. As such, the UE(s) may transmit SL packets by accessing the SL resource(s) on the NUL carrier and/or the SUL carrier(s). In some implementations, the UE(s) may transmit SL packets on the NUL carrier and the SUL carrier(s) simultaneously. In some implementations, the UE(s) may only choose the SL resource(s) on either the NUL carrier or the SUL carrier(s) (e.g., depending on whether a NUL or a SUL is used in the UL direction).

In some implementations, the UE may need to transmit the UE's capability of SL carrier aggregation to the serving cell.

As shown in FIG. 2B, a validity area configuration in FR2 may be associated with Cell #1 in FR1. Implementations of the present disclosure may improve the UE's power consumption since the UE(s) does not need to perform SL synchronization and SL cell (re)selection in FR2.

As discussed above, the SL synchronization on CC #1 may be with a Global Navigation Satellite System (GNSS), a base station (eNB or gNB), or a neighboring UE (LTE UE or NR UE). In addition, in some implementations, the UE may be in an NR-RRC Idle state, an NR-RRC Inactive state, an LTE-RRC Idle state, or an LTE-RRC Inactive state. In some implementations of the present disclosure, the UE may receive the above-mentioned configurations through system information. In some implementations of the present disclosure, the UE may receive the above-mentioned configurations while the UE in an NR-RRC Connected state or an LTE-RRC Connected state. In some implementations of the present disclosure, the UE may receive the above-mentioned configurations through (UE-specific) dedicated RRC signaling. In some implementations of the present disclosure, the UE may receive the above-mentioned configurations through dedicated RRC signaling (e.g., an RRC Connection Resume message, an RRC Release with suspend configuration message), while the UE is an NR-RRC Inactive state or an LTE-RRC Inactive state.

As shown in FIG. 2A, the UE (e.g., UE1 and/or UE2) is camped on Cell #1 in CC #1 (located on FR1). The UE may be in an NR-RRC Inactive state/NR-RRC Idle state/NR-RRC Connected state.

In some implementations, the SL resource configuration on FR1 (e.g., CC #1) and FR2 (e.g., CC #2) may be configured with one associated validity area. On the UE side, the UE (e.g., UE1 and/or UE2) may know that the SL resource configuration on CC #2 is valid under the coverage of the configured validity area associated with cells in CC #1 (e.g., Cell #1). In addition, the UE (e.g., UE1 and/or UE2) may not need to perform SL synchronization or SL cell (re)selection in CC #2 when the UE is accessing the configured SL resource (e.g., while the UE is transmitting SL packets on the configured SL resource). In some additional implementations, the UE may still implement sidelink synchronization and/or (non-serving) cell (re)selection on the CC #2. However, the UE may only need to check whether the selected cell on CC #2 is located on the sidelink resource validity area based on the pre-stored validity area information associated with CC #2. In other words, the UE may not need to monitor other DL control signaling for sidelink resource configuration delivered by the selected cell on the CC #2.

In some implementations, the configured SL resource may include dynamic SL grant, Type 1 SL configured grant, Type 2 SL configured grant, SL resource pool, and SL exceptional pool in the appointed SL component carrier (e.g., CC #2 in FIG. 2B). In addition, it is noted that the serving cell (e.g., Cell #1) may transmit the configuration of Type 1 SL configured grant to the UE (e.g., UE1 and/or UE2) through broadcasting message (e.g., system information) or dedicated control signaling (e.g., (UE-specific) RRC signaling). On the UE side, the configuration of Type 1 SL configured grant is valid to the UE (e.g., UE1 and/or UE2) right after the UE decoding the configuration from the serving cell successfully. So, the UE (e.g., UE1 and/or UE2) can transmit SL packets by accessing the configured Type 1 SL configured grant.

The serving cell (e.g., Cell #1) may transmit part of the configuration of Type 2 SL configured grant (e.g., the periodicity in time domain for the Type 2 SL configured grant) to the UE (e.g., UE1 and/or UE2) through broadcasting message (e.g., system information) or dedicated control signaling (e.g., RRC signaling). Then, the serving cell may configure the other part of Type 2 SL configured grant (e.g., the locations of SL resource blocks, such as sub-channel and symbols in frequency domain and time domain respectively) by transmitting other dedicated control signaling (e.g., Downlink control information scrambled by C-RNTI of the UE or Medium Access Control Control Element (MAC CE)) to the UE. So, after receiving the DCI from the serving cell (e.g., Cell #1 in CC #1), the configured Type 2 SL configured grant is activated to the UE and so the UE can transmit SL packets on the configured Type 2 SL configured grant. On the other hand, to an activated SL configured grant, the serving cell may transmit another DCI to de-activate this SL configured grant. After receiving the de-activation message, the UE may stop accessing the configured Type 2 SL configured grant and release the stored configurations which the UE receives through the activation DCI message. In other words, the configurations received through RRC signaling may still be kept by the UE, so that next time the serving cell may configure other SL resource in another activation DCI to activate one Type 2 SL configured grant.

The SL resource pool configuration or SL exceptional resource pool configuration may be provided to the UE (e.g., UE1 and/or UE2) so that the UE can select SL grant autonomously with/without sensing (e.g., by random selection) or through partial sensing mechanism.

The SL resource configuration may be associated with (at least) one SL bandwidth part (SL-BWP) configuration in one SL component carrier. Each SL bandwidth part configuration may include the numerology of the operating SL component carrier (e.g., the length of cyclic prefix, subcarrier spacing, etc).

It should be noted that, in various implementations of the present disclosure, RRC signaling may cover the RRC signaling in (LTE/NR) Uu interface, such as RRC(Connection)(Re)Establishment message, RRC(Connection)Setup message, RRC(Connection)Resume message, RRC(Connection)Release message with/without suspend configuration, RRC(Connection)Reconfiguration message with/without mobilitycontrolinfoV2X, or RRC(Connection) Reconfiguration message with/without reconfigurationwithsync message, etc. In addition, the reconfigurationwithsync/mobilitycontrolinfoV2X message may be delivered when the serving RAN is instructing the UE to implement (intra-RAT/inter-RAT) handover procedure, Secondary Cell Group change, etc.

It should noted that, the above-mentioned configurations may also be applicable during an intra-RAT (e.g., from a source LTE cell to a target LTE cell or from a source NR cell to a target NR cell) handover procedure, an inter-RAT (e.g., from a source LTE/NR cell to a target NR/LTE cell respectively) handover procedure, an inter-system handover procedure in LTE protocols, an conditional handover procedure and a Dual Active Protocol Stack (DAPS) handover procedure. In some additional implementations, the above-mentioned configuration may also be applicable during an MCG-change/SCG-change procedure. In addition, during the handover procedure, the serving cell may apply delta signaling approach to re-configure the SL resource configuration (e.g., SL resource configuration of CC #2 in this disclosure). For example, to provide new SL resource (pool) configuration, the serving cell may transmit SL_Resource_(Pool)_ToAdd list to transmit new SL resource (pool) configuration to the UE. Then, the UE may store the new SL resource (pool) configuration with the stored SL resource (pool) configuration. In addition, all of the stored SL resource (pool) configuration may be further associated an SL resource (pool) index. So, the serving cell may instruct the UE to release one SL resource (pool) configuration by indicating the associated SL resource (pool) index in another SL_Resource_(Pool)_ToRemove list. The SL_Resource_(Pool)_ToAdd list & SL_Resource_(Pool)_ToRemove list may be included in the IE reconfigurationwithsync(in NR protocols)/mobilitycontrolinfoV2X(in LTE protocols) when the serving cell is transmitting RRC Connection Reconfiguration message to initiate handover procedure. It should be noted that the above-mentioned mechanisms and signaling may also be applicable to conditional handover procedure. It should be noted that the sidelink resource pool configuration may include a normal sidelink resource pool configuration and/or an exceptional sidelink resource pool configuration. It should be noted that the delta signaling approach may be applicable to a (Type1/Type2) sidelink configured grant configuration.

In some implementations, the UE may start to access the configured SL resource (pool) after the handover procedure is finished successfully. In some implementations, the UE could access the configured SL resource (pool) during the handover procedure. In some additional implementations, the UE could access the configured SL resource (pool) during the conditional handover procedure.

In some implementations, the UE may obtain the timing advance instruction or timing offset value represented in symbols, microseconds, etc (or assistance information for the UE to adjust timing when the UE is transmitting/receive SL packets) for SL packet delivery on FR2 by receiving the timing reference or timing advance instructions from the serving cell on FR1 (e.g., Cell #A).

Table 1 shows a validity area configuration of an SL resource on FR1 (e.g., CC #1 in FIG. 3) or FR2 (e.g., CC #2 in FIG. 2A).

TABLE 1

| Cross-Carrier Validity Area Configuration | |
|---|---|
| Cross-Carrier Validity Area Configuration with SL Resource Configuration | |
| Cellidentitylist | (1) In some implementations, the SL resource configuration on FR2 (in SL CC#2) may be associated to a cellidentitylist, which includes at least one cell identity in another component carrier (e.g., CC#1 in FIG. 3). |
| | (2) In addition, each cell identity may be associated with one cell operating on CC#1 (which is also the serving frequency to the UE). |
| | (3) The cell identity may be physical cell identity (PCI) or cellidentity which is unique with associated network (e.g., PLMN or NPN). |
| | (4) In some additional implementations, at least one cell configured in the cellidentitylist may be further associated with one PLMN identity or one NPN identity. |
| | (5) In some implementations, UE would implicitly know that the configured SL resource on CC#2 is valid only in the coverage of serving cell in CC#1 (e.g., Cell#1 in FIG. 3) while no explicit validity area configuration is provided with the SL resource configuration. |
| Systeminformationarea configuration | (1) In some implementations, the SL resource configuration on FR2 (e.g., CC#2) may be associated with one systemInformationAreaID, which is broadcast by cells in FR1 (e.g., CC#1). |
| | (2) So, the UE would know that the UE can still access the configured SL resource of CC#2 while the UE is still camping on CC#1 while the serving cell to the UE is broadcasting the same systemInformationAreaID. |
| | (3) In some implementations, the systemInformationAreaID is generally applied to all or a subset of of the system information broadcast by the serving cell (e.g., the system information which contains the (LTE) V2X sidelink configuration (V2X-SL SIB) and/or the system information which contains the NR sidelink configuration (NR-SL SIB)), such as the SIB12, SIB13, and SIB14 in the NR protocols. |
| | (4) In some other implementations, a specific area ID (e.g., systemInformationAreaID_V2X may be configured to be associated with the system information to support (LTE/NR) V2X (sidelink) service. |
| RAN notification area Code or Tracking Area Code | (1) In some implementations, the validity area may be associated with one RAN Notification Area Code (RANAC). In addition, each RAN Notification Area may cover one or more cells in one PLMN and each RANAC may be unique in one PLMN. |
| | (2) In some implementations, the validity area may be associated with one Tracking Area Code (TAC). In addition, each Tracking area may cover one or more cells in one PLMN/NPN and each TAC may be unique in one PLMN. |
| Area defined by GNSS | In some implementations, the validity area may be configured based on an area defined by GNSS (e.g., based on the coordinates provided by GNSS). |
| Reuse Supplementary uplink carrier (SUL) configuration | In NR protocols, a NR cell may support uplink resource configuration on both Normal uplink carrier and supplementary uplink carrier. So, the camped Cell#1 may also broadcast SUL configuration in system information (e.g., SIB1). |
| | (1) In some implementations, the serving cell to the UE is camped on CC#2. In addition, the serving cell may broadcast SL resource configuration on the operating normal uplink (NUL) carrier (e.g., NUL carrier in CC#2 or other component carrier in FR2) and/or supplementary uplink (SUL) carrier (in CC#1 or other component carrier in FR1). In addition, the serving cell may also deliver supplementary uplink carrier configuration in system information. |
| | (3) So, to the UE side, the UE would know that it can access the SL resource configured on the NUL carrier (in FR2) and SUL carrier (in FR1). In addition, the UE may not need to do SL cell (re)selection in the SUL carrier (in TDD scenario) or try to find out the downlink frequency carrier associated with the SUL carrier. |
| PLMN-specific association to the validity area design | (1) In RAN, one cell (e.g., Cell#1 in CC#1) may be shared by different PLMNs and so the cell would broadcast PLMN identity(-ies) to indicate the PLMN(s) supported by the cell. In addition, Cell#1 may also support V2X services of different PLMN(s). Each PLMN may have individual SL resource configurations. |

TABLE 1-continued

Cross-Carrier Validity Area Configuration
Cross-Carrier Validity Area Configuration with SL Resource Configuration (2) To the UE side, the UE may subscribe the NR-V2X/LTE-V2X (sidelink) service with its registered telecom operator and the operator may deploy (at least) one PLMN(s) to support the subscribed UEs. So, the UE could access the RAN and implement SL operation based on the given configuration associated with the registered PLMN (e.g., Home PLMN or equivalent HPLMN). To enable UEs to implement NR-V2X/LTE-V2X SL operation based on the SL resource configurations of their registered PLMNs, RAN may deliver the validity configurations associated with PLMN identity(-ies) to the UEs.

(3) In some implementations, an implicit approach may also be configured to the UE (e.g., the transmitted SL resource configuration may be implicitly associated to the $1^{st}$ PLMN shown in the PLMN list, which is broadcast in the SIB1 of the serving cell). In some additional implementations, the cells in the cellidentitylist may be associated with more than one PLMN. So, each cellidentity in the cellidentitylist may be further indicated the associated PLMN identity.

(4) The serving cell may deliver the validity area configurations with associated PLMN(s) through broadcasting system information (e.g., system information broadcasting or SI-on-demand procedure) or dedicated signaling (e.g., RRC signaling).

(5) Also, in some additional implementations, the mapping information with one associated PLMN may be represented by a 'PLMN index'. The 'PLMN index' is decided based on the sequence of PLMN shown in the PLMN identity list, which is broadcast by the cell in system information (e.g., SIB1 broadcast by Cell#1).

(6) Please also note that the PLMN in this disclosure may also cover the Non-Public-Network (NPN) scenario. The validity configuration may associate to NPN identity (e.g., PLMN ID and/or NID for SNPN, PLMN ID and/or CAG ID for PNI-NPN). In some implementations, The NPN scenario may be a Stand-alone Non-Public Network (SNPN), i.e., the RAN is operated by an NPN operator and it does not rely on network functions provided by a PLMN. In some other implementations, the NPN scenario may be a Public network integrated NPN (PNI-NPN), i.e., a non-public RAN is deployed with the support of a PLMN. The SNPN(s) may be identified by UEs based on the PLMN ID and/or Network ID (NID) broadcast in SIB1 of a cell which supports SNPN. The PNI-NPN may be identified by PLMN ID and/or Cell Access Group (CAG) ID broadcast in SIB1 of a cell supporting PNI-NPN.

(7) In some additional implementations, one UE may receive the SL resource configuration (with the validity area configuration with/without associated PLMN identities) through PC5 interface (e.g., by receiving the broadcasting MIB-SL (MasterInformationBlock_SL) or the (broadcasting/multi-casting(group-casting)/unicasting) PC5 RRC signaling transmitted by neighbor UEs).

It should be noted that the sidelink resource configuration on CC#2 and the RAN on CC#1 may be implemented by different RATs. In some implementations, sidelink resource configurations for (LTE) V2X sidelink communication may be configured on CC#2 and the associated cross-carrier validity Area Configuration may be implemented on an NR-RAN, which is operating on CC#1. In some additional implementations, sidelink resource configurations for NR sidelink communication may be configured on CC#2 and the associated cross-carrier validity area configuration may be implemented on an E-UTRAN, which is operating on CC#1.

It should also be noted that, in some implementations, cross-carrier validity area configuration may be implemented jointly with other validity area information. For example, while the UE is camping on a serving cell in CC#1, the CC#1 may configure the sidelink resource configuration of CC#2 with one additional cellidentitylist, which is composed by one or more cell identities of the cells operating on CC#2. In addition, the UE may need to implement a non-serving cell (re)selection procedure on CC#2 for sidelink operations. So, the UE needs to check the validity of the sidelink resource configuration based on the cross-carrier validity area configuration (associated with CC#1) and the cellidentitylist (associated with CC#2).

It should be also noted that, in some implementations, the validity area of the sidelink resource configuration may be implicitly associated with the cell identity of the serving cell of the first RAT (e.g., NR cell#1 in CC#1). This condition may happen when the sidelink resource configuration is not indicated by the systemInformationAreaID broadcast by the serving cell. For example, when the system information related to NR/LTE (V2X) sidelink operation (e.g., SIB12, SIB13, SIB14 in NR protocols, which contains the sidelink resource configuration) is not configured with 'AreaScope = {true}' by the serving cell in the SIB1, or when the systemInformationAreaID is absent from the system information broadcast by the serving cell, the validity area of the first RAT is composed by the cell identity of the serving cell of the first RAT.

Figure 3:
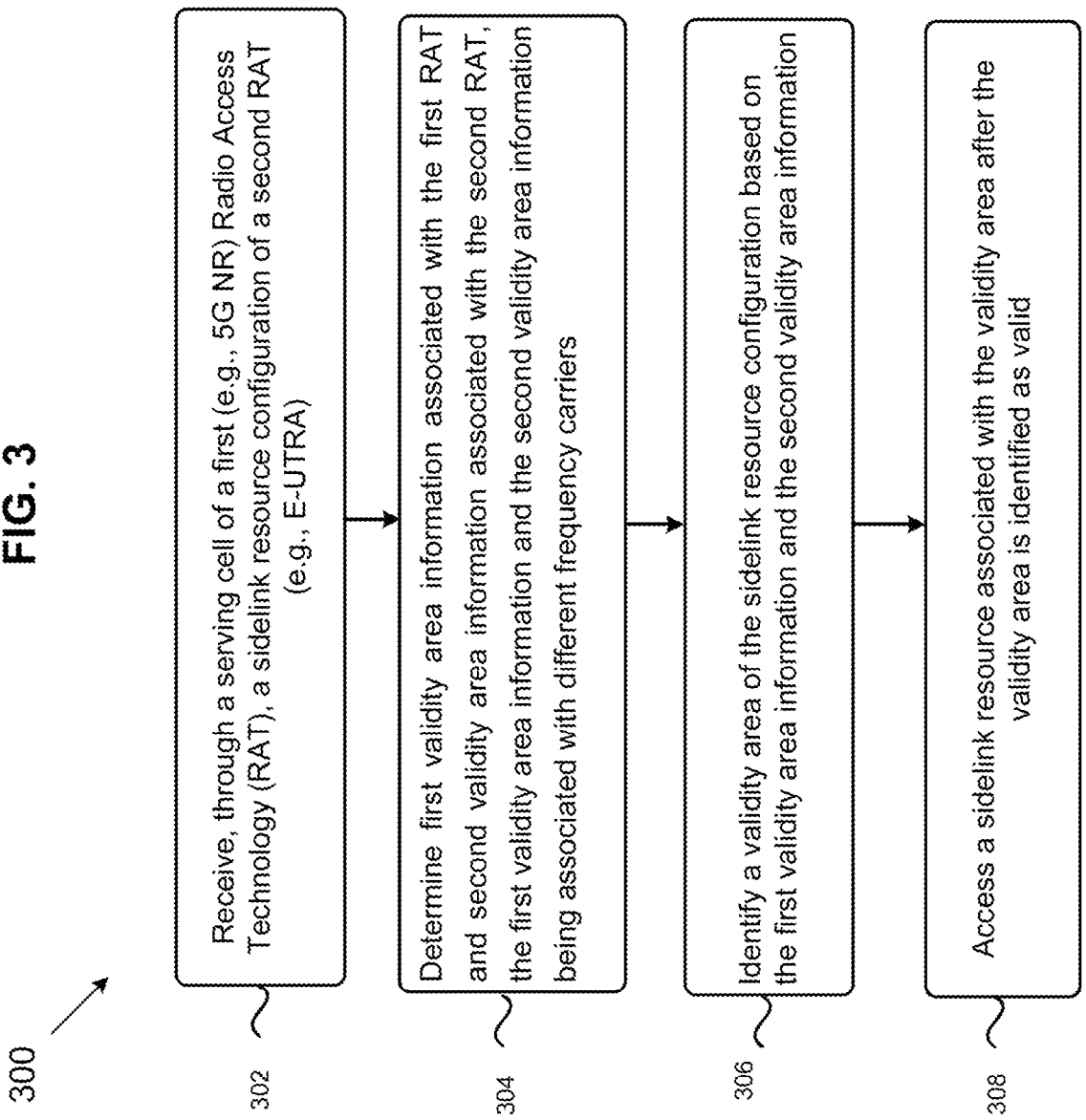
FIG. 3 is a flowchart 300 of a method performed by a UE for NR SL operations, in accordance with an example implementation of the present disclosure.

FIG. 3 is a flowchart 300 of a method performed by a UE for NR SL operations, in accordance with an example implementation of the present disclosure.

Inaction 302, the UE may receive, through a serving cell of a first (e.g., 5G NR) Radio Access Technology (RAT), an SL resource configuration of a second RAT (e.g., E-UTRA).

In action 304, the UE may determine first validity area information associated with the first RAT and second validity area information associated with the second RAT, the first validity area information and the second validity area information being associated with different frequency carriers.

In action 306, the UE may identify a validity area of the SL resource configuration based on the first validity area information and the second validity area information.

In action 308, the UE may Access an SL resource associated with the validity area after the validity area is identified as valid.

Figure 4:
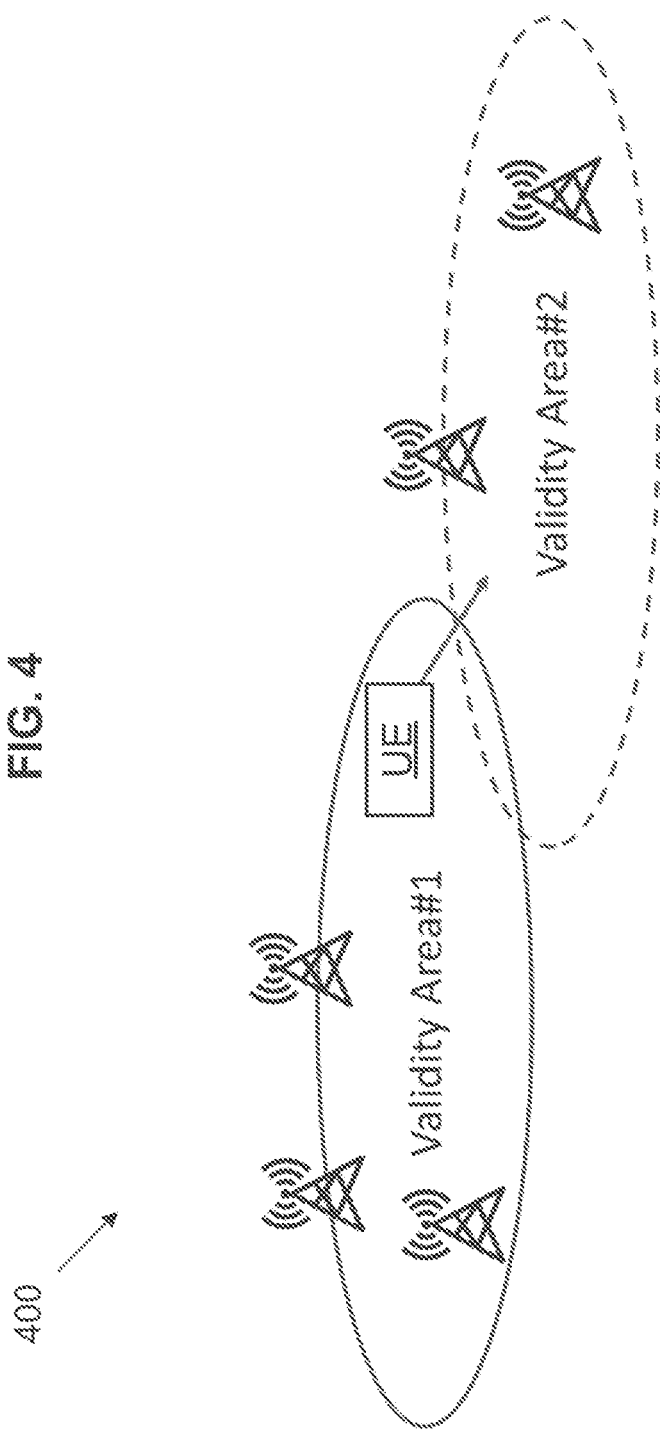
FIG. 4 illustrates a diagram showing a UE performing SL synchronization and SL cell (re)selection procedures under a fallback mechanism to a cross-carrier validity area configuration, in accordance with an example implementation of the present disclosure.

Implementation 2: Fallback Mechanism to Cross-Carrier Validity Area Configuration Referring to FIG. 4, FIG. 4 illustrates a diagram showing a UE performing SL synchronization and SL cell (re) selection procedures under a fallback mechanism to a cross-carrier validity area configuration, in accordance with an example implementation of the present disclosure.

In the present implementation, the cross-carrier SL resource configuration associated with a validity area (e.g., Validity Area #1) may be invalidated by a UE after the UE moves out of the validity area to another validity area (e.g., Validity Area #2).

In some implementations, the UE may release the invalidated cross-carrier SL resource configuration after the UE moves out of the validity area associated with the stored SL resource configuration.

In some implementations, the UE may start performing SL synchronization and SL cell (re)selection procedures on FR2 when one of more of the following fallback conditions are met:

Condition 1: the UE may not be configured with other SL resource configuration nor validity area in FR2 (e.g., but CC #2 still supports SL in the areas out of Validity Area #1). In this condition, the UE may initiate SL synchronization and SL cell (re)selection in the SL CC #2 by the UE itself.

Condition 2: In some other conditions, the UE may be configured with another validity Area #2 in FR1 but the UE may temporarily fail to find out a suitable cell (e.g., while the UE moves to a coverage hole). In this condition, the UE may implement SL synchronization and SL cell (re)selection in the SL CC #2 by the UE itself.

Condition 3: the serving cell in FR1 does not provide validity area in FR. Instead, the serving cell in FR1 may configure SL resource configuration in FR2 with validity area indicated in FR2 (e.g., the Validity Area #2 in FIG. 3). For example, the Validity Area #2 may be composed by the cells operating in CC #2. In some additional implementations, the Validity Area #2 is composed by the cellidentity/PCI/RANAC/Tracking area code/SysteminformationareaID broadcast by cells in FR2. In this condition, the UE may implement SL synchronization and SL cell (re)selection in the SL CC #2 by the UE itself.

It is noted that, after the SL cell (re)selection procedure, the UE may start monitor the system information broadcast by the selected (non-serving) cell for sidelink resource configuration reception (on the CC #2).

Figure 5:
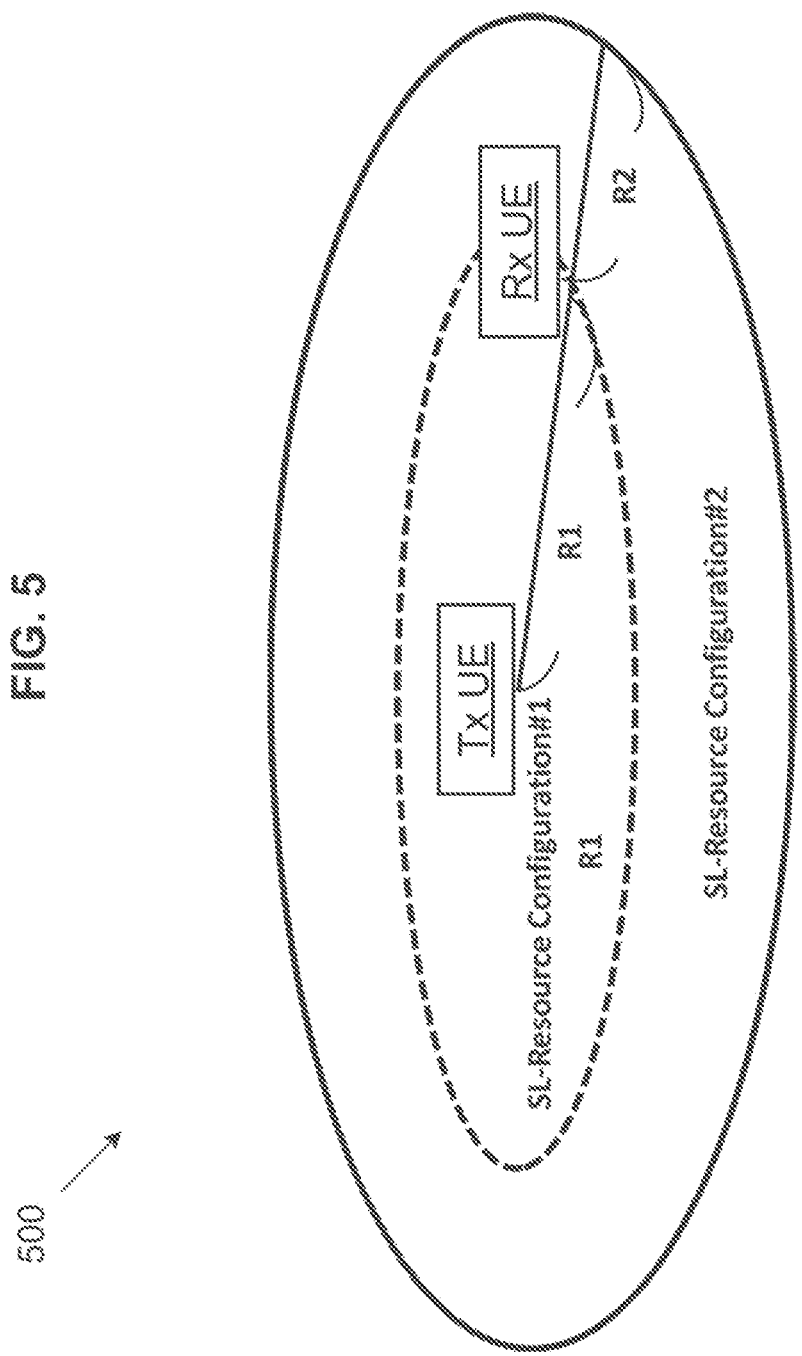
FIG. 5 illustrates a range-based SL resource association in accordance with an example implementation of the present disclosure.

Referring to FIG. 5, FIG. 5 illustrates a range-based SL resource association in accordance with an example implementation of the present disclosure. In the present implementation, each SL LCH may have one or more associated SL carriers. One or more range-based SL resource configurations may be configured to a UE. For example, SL-Resource configuration #1 and SL-Resource configuration #2 may be provided to the UE with a distance-based threshold, R1 (e.g., in the unit of meters).

In one example, a UE (e.g., UE #2 in FIG. 2B) may apply SL-Resource Configuration #1 to transmit SL packets with a paired UE (e.g., UE #1 in FIG. 2B) while the physical distance between the Tx UE/Rx UE is smaller than R1. For example, the value of R1 may be up to several hundred meters.

In another example, a UE (e.g., UE #2 in FIG. 2B) may apply SL-Resource Configuration #2 to transmit SL packets with a paired UE (e.g., UE #1 in FIG. 2B) while the physical distance between the Tx UE and Rx UE is larger than R1.

In some implementations, a UE (e.g., UE #2 in FIG. 2B) may estimate the physical distance with another UE (e.g., UE #12 in FIG. 2B) by receiving the SL control information (SCI) (e.g., based on the received $1^{st}$ SCI and/or the $2^{nd}$ SCI during the two-stage SCI transmission procedure) transmitted by the (Tx) UE (e.g., by decoding the location information, such as zone ID or GNSS location information, of the Tx UE). In some other implementations, a UE may estimate the physical distance with another UE through other radio access technologies, such as an NR positioning technique or a GNSS information exchange.

It should be noted that the SL packet delivery may become more critical when UE #1 and UE #2 are close to each other. In addition, the channel effect (e.g., pathloss) on different SL CC may also need to be considered. Therefore, to one SL LCH, associations with different SL CCs (and so the SL resource configurations, such as Type1/Type2 SL configured grant(s), SL dynamic grant(s), resource pool(s), exceptional resource pool(s) associated with the SL CC) may be helpful to preserve the QoS (Quality of Service) of SL packet delivery. As shown in Table 2, SL logical channel #1 may be associated with CC #1 (in FR1) in the SL-Resource Configuration #2 since the pathloss effect in FR1 is smaller than that in FR2. Then, while the physical distance between the Tx UE/Rx UE is smaller than R1, the SL logical channel #1 may be associated with CC #2 (e.g., in FR2) in the SL-Resource Configuration #2. In addition, in some other implementations, one SL LCH may be associated with more than one SL component carrier. As shown in Table 2, the SL logical channel #2 may be associated {CC #1} in the SL-Resource configuration #2 and the same SL logical channel #2 may be associated {CC #1, CC #2, CC #3} in the SL-Resource configuration #2 and so the UE may implement SL multiplexing to an SL grant (based on the received SL resource configuration in one SL CC, such as Type1/Type2 SL configured grant(s), SL dynamic grant(s), resource pool(s), resource pool(s) with zone configuration, exceptional resource pool(s) associated with the SL CC) based on the range-based association with the SL LCH and SL CC. Also, it is noted that, in some implementations, the operating SL CC(s) for SL HARQ or SL Automatic Repeat reQuest (ARQ) packet re-transmission or SL packet repetition may be decided while the UE is preparing to transmit a first SL packet. So, the UE may not change the operating SL CC while the UE is implementing SL HARQ/ARQ packet re-transmission and SL packet repetition to the same SL packets after the UE sending the first SL packet. In some implementations, the UE may decide the operating SL CC(s) (based on the configured rules) of each SL packet delivery independently every time when the UE is preparing to transmit one or more SL packet(s) (no matter whether the SL packet is first transmission, (SL-HARQ) re-transmission, or repetition).

TABLE 2

Range-Based SL Resource Association

| | SL-Resource config.#2 | SL-Resource config.#1 |
|---|---|---|
| SL logical channel#1 | {CC#1} | {CC#2} |
| SL logical channel#2 | {CC#1} | {CC#1, CC#2, CC#3} |

In some implementations, a default SL resource association (e.g., SL-Resource config. #1) may be indicated to the UEs in the SL-group (e.g., unicast group or group-cast group). Thus, if the location information is (temporarily) unavailable to the Tx UE side, then the Tx UE may apply the default SL resource association to transmit SL packets. In some implementations, the default SL resource association may be obtained through SL pre-configuration or through broadcasting message (e.g., System Information (SI)) or through SI on-demand procedure which the Tx UE obtains from the serving RAN.

Implementation 3: NR Non-Standalone Cell Broadcasting SL Configuration

An NR non-standalone cell (NR-NSA cell) may also broadcast system information to support NR (public safety) V2X service/LTE V2X service or public safety SL communication service. In some implementation, a NR-NSA cell may not broadcast tracking area code (TAC) while the NR-NSA cell is broadcasting system information and so the UE could identity whether a cell is an NSA cell by checking the TAC. In addition, the UE may consider the NR-NSA cell as a non-suitable cell while the UE is performing cell (re)selection (e.g., cell (re)selection in (LTE/NR) Uu interface). However, it is still possible that the UE may select one NR-NSA cell during (serving/non-serving) cell (re)selection as the cell to provide SL communication. So, an NSA cell may become the serving cell to the UE and the concerned SL CC is also the serving frequency to the UE. At this stage, the NR-NSA cell may be an 'acceptable cell' to the UE and the UE may select to camp on a NR-NSA cell after the (serving/non-serving) cell (re)selection procedure (so the UE may also move to 'camped on any cell' state). The UE may stay in 'limited service state'. However, even in 'limited service state', the UE may still be able to access some (limited) LTE/NR V2X service through NR/LTE SL while the UE is camping on a NR-NSA cell. In addition, one UE may still be able to exchange PC5 RRC signaling with neighboring UEs while the UE is in the 'limited service state' (so, the PC5 RRC signaling exchange may not be impacted if one of the UEs move to 'camped on any cell state'). Thus, an NR-NSA cell may broadcast NR/LTE SL configurations, which may include SL resource pool configuration, SL exceptional pool configuration, and SL synchronization configuration, to support SL operations for NR/LTE V2X service. In addition, the UE may think it is in-coverage while it is camping on an NR-NSA cell (or while the UE selects an NR-NSA cell). It should be noted, in some implementations, the NSA cell may broadcast SL transmission resource pool configuration (e.g., v2x-CommTxPoolNormalCommon or p2x-CommTxPoolNormalCommon or discovery resource pool based on the 3GPP TS 36.331.f6.0) associated with the camped frequency in the broadcasting system information. In addition, the UE may not initiate an RRC connection with the NSA cell when the NSA cell does broadcast SL information about V2X service, but the NSA cell does not transmit SL transmission resource pool configuration which the UE needs (e.g., for V2X service, P2X service or for discovery service) in the broadcast system information. In some implementations, the UE may not expect an NSA cell would broadcast SL resource configuration without delivering the SL transmission resource pool configuration (e.g., v2x-delCommTxPoolNormalCommon or p2x-CommTxPoolNormalCommon) in the camped frequency carrier.

In some implementations, the NSA cell may operate on a non-serving frequency, the NSA cell may also be included while the UE is implementing cell selection and reselection for SL operations (by taking the cell selection and reselection for SL mechanism in 3GPP TS 36.304.15.6.0 as the baseline). Moreover, the NSA cell may also transmit SL resource configuration associated with the concerned SL frequency carrier (with or without SL resource configuration associated with other SL CCs), the UE may transmit and/or receive SL packets on the concerned SL CC based on the received SL resource configuration and based on the timing information (e.g., DL timing) obtained from the NSA cell.

Implementation 4: FR2 Assistance Information Delivery Through FR1

In IMPLEMENTATION 4, further association between an SL CC on FR1 (e.g., CC #1) and an SL CC on FR2 (e.g., CC #2) may be configured. For example, a UE may be configured to deliver FR2 assistance information of SL operation on FR2 through the SL CC #1. In some implementations, the UE may transmit FR2 assistance information to the serving cell in FR1 (e.g., CC #1 in FIG. 2) through LTE/NR Uu interface. In some implementations, the UE may transmit FR2 assistance information to neighboring UEs (e.g., an SL group leader in an SL multi-cast (/group-cast) group, such as UE #1 in FIG. 2) through LTE/NR PC5 interface. In some implementations, FR2 assistance information may be transmitted to a serving cell (through (LTE/NR) Uu interface) or a paired UE (through PC5 RRC signaling (LTE/NR) PC5 interface) by transmitting an SL-measurement report.

TABLE 3

FR2 Assistance Information
FR2 Assistance Information (e.g., CC#2 in FIG. 1)

| | |
|---|---|
| Measurement Report on CC#2 | UE may transmit SL measurement report on FR2 (e.g., CC#2 in FIG. 2), which may include (which is called FR2 measurement configuration in this disclosure):<br>1) SL CSI-RS report (with one associated destination ID);<br>2) SL beam measurement report (with one associated destination ID);<br>3) SL beam failure indication on CC#2 (with one destination ID);<br>4) SL radio failure indication on CC#2 (e.g., T310_SL is configured to CC#2. The MAC entity may receive in-sync/out-of-sync indications, which is decided by the lower layers based on the channel conditions (e.g., SL RSRP value) on CC#2, from the lower layers). |

TABLE 3-continued

FR2 Assistance Information
FR2 Assistance Information (e.g., CC#2 in FIG. 1)

| | |
|---|---|
| | 5) In some implementations, the MAC entity may receive up to N consecutive SL HARQ DTX indications from the lower layers. Here, one SL HARQ DTX indication means the Tx UE has not receive any response (neither HARQ ACK/NACK message) after one SL HARQ packet transmission to the Rx UE (e.g., with one Layer 2 Destination ID). Under this condition, the MAC entity may report this event (e.g., reaches up to N consecutive SL HARQ DTX indications in MAC entity associated with one Layer2/Layer1 Destination UE ID) to the upper layers (e.g., the RRC layer). Then, the RRC layer may trigger an SL radio failure to the associated with Rx UE (e.g., Sidelink Radio Link Failure event happens to the PC5 RRC connection associated with the Layer 2 Destination ID).<br>6) Channel busy ratio (CBR) report in CC#2.<br>7) Channel Occupancy ratio (CR) report in CC#2.<br>Here, the destination ID may be an identifier provided by higher layer (e.g., V2X layer) or a Layer-2/Layer-1 ID. For example, when the UE#2 (as shown in FIG. 3) is transmitting FR2 assistance information to the serving cell or UE#1. The UE#2 may also transmit the UE#1's ID (e.g., Layer 2 UE ID) with FR2 assistance information as the destination ID. |
| SL Radio Link Failure Report | 1) UE may be configured to report SL radio link failure indication or physical layer problem on CC#2 (with one associated destination ID);<br>Here, the destination ID may be an identifier provided by higher layer (e.g., V2X layer) or a Layer-2/Layer-1 ID of the paired UE. |
| Resource configuration for the assistance information delivery in Uu interface | In some implementations, the UE may be configured with resource in NR/LTE Uu interface which is specified for the UE to report FR2 assistance information reporting to the serving cell (e.g., Cell#1 in FR1). For example,<br>1) The UE is configured with Type 1/Type 2 configured grant for periodic FR2 assistance information report to the serving cell. In addition, explicit association may be provided in the configuration that one (Type 1/Type 2) configured grant on CC#1 is reserved for FR2 assistance information reporting (e.g., by configuring one configured grant to be associated with one FR2 measurement configuration) and so the UE would transmit FR2 assistance information through the associated configured grant.<br>2) In some additional implementations, the UE (e.g., UE#2) may be configured with FR2 measurement configuration of more than one paired UE(s) (or more than one destination ID). In addition, these FR2 assistance information may share configured grant(s) for the UE to transmit FR2 assistance information. |
| SL resource configuration for the assistance information delivery in PC5 interface | In some implementations, the UE may be configured with SL resource which is specified for FR2 assistance information reporting. For example,<br>1) The UE is configured with Type 1/Type 2 SL configured grant(s) on CC#1 for periodic FR2 assistance information report. In addition, explicit association may be provided in the configuration of SL configured grant to configure that one (Type 1/Type 2) SL configured grant on CC#1 is reserved for FR2 assistance information (e.g., by configuring one SL configured grant to be associated with FR2 assistance information) and so the UE may transmit FR2 assistance through the associated Type 1/Type 2 SL configured grant.<br>2) In some additional implementations, the UE (e.g., UE#2) may be configured with FR2 measurement configuration of more than one paired UE(s) (or more than one destination ID). In addition, these FR2 assistance information may share configured grant(s) for the UE to transmit FR2 assistance information.<br>3) Small Data Transmission: in some additional implementations, the serving cell may configure Type 1/Type 2 UL configured grant(s) on CC#1 for (periodic/non-periodic) FR2 assistance information reporting while the UE is staying in the RRC Connected state/RRC Inactive state. In some additional implementations, the UE may be enabled to transmit a FR2 assistance information report through a (2-step/4-step) random access procedure. It is noted that, in addition to (periodic/non-periodic) FR2 assistance information reporting, the UE may also be enabled (e.g., the serving cell may deliver one explicit DL control signaling to enable the UE to do sidelink UE information delivery through small data transmission approaches during RRC inactive state) to transmit sidelink-related information to the serving cell through the (Type1/Type2) UL Configured Grant Configuration and/or the (2-step/4-step) random access procedures while the UE is staying in the RRC Inactive state. In some implementations, the sidelink-related information may |

TABLE 3-continued

FR2 Assistance Information
FR2 Assistance Information (e.g., CC#2 in FIG. 1)

| | |
|---|---|
| | include SidelinkUEInformationNR, a sidelink radio link failure report (with one ore more Layer 2 Destination UE ID(s)), an SL-measurement report, etc. In addition, the small data transmission may not be limited by FR2 Assistance Information but also include other SL reporting (e.g., Channel Busy Ratio Report in one or more SL CCs). |
| SL-measurement report | In some of the presented implementations, the FR2 Assistance Information may be transmitted through (LTE/NR) Uu interface or (LTE/NR) PC5 interface by transmitting SL-measurement to the serving cell or other UEs.<br>SL-measurement report may cover the following Information Elements:<br>(1) SL-measurement report may include (at least) one CarrierFreq_SL (e.g., represented by NR-ARFCN (absolute radio-frequency channel number) value), which indicates the target of corresponding SL component.<br>(2) In the indicated CarrierFreq_SL, the UE may report the SL CSI-RS transmitted by one target UE to obtain the {Sidelink Reference Signal Received Power Result (rsrpResult_SL), Sidelink Reference Signal Received Quality Result (rsrqResult_SL), Sidelink Signal to Interference & Noise Result (sinrResult_SL)} corresponding to the target UE (the target UE is associated with one Layer 2 Destination UE ID in the SL-measurement report).<br>(3) In some additional implementations, in the indicated CarrierFreq_SL, the UE may report the observed CBR of the concerned SL-CC.<br>(4) In some additional implementations, to one specific destination UE ID, the UE may report SL-measurement result corresponding to one MeasResultSL-Synchronization Signal Block (SSB)-index. The UE may include the index of the SL-SSB (being associated with one Destination UE ID and one CarrierFreq_SL) and the measurement result of the associated SL-SSB index (e.g., {rsrpResult_SL, rsrqResult_SL, sinrResult_SL}). In some other implementations, the SL-measurement report may not be associated with SL-SSB but be associated with one configured SL reference signal (e.g., SL CSI-RS with one associated reference signal index).<br>(5) In some additional implementations, the UE may include MeasResultCBR (e.g, CBR-PSSCH, CBR-PSCCH) associated with (at least) one indicated resource pool identity (e.g., with one SLresourcepoolidentity, which may be configured by serving RAN) in one FR2 SL-CC (e.g, being indicated by CarrierFreq_SL).<br>(6) In some additional implementations, the UE may indicate channel occupancy ratio (e.g, channelOccupancy_SL = integer (0, 100) to indicate the percentage of channel occupancy ratio) with (at least) one FR2 SL-CC (e.g, being indicated by CarrierFreq_SL). The channel occupancy ratio is obtained by monitoring the percentage of samples when the RSSI in the concerned SL-CC was above a pre-configured channelOccupancyThreshold. |

In some of the present implementations, a UE may be configured with event-based SL measurement objects to provide SL-measurement reports after an SL radio link failure event (or SL physical layer problem) occurs. In the present disclosure, an additional timer, T312_SL, is introduced where the T312_SL may be configured to a UE with configured SL measurement objects. Moreover, in the present disclosure, the SL measurement objects may include the SL-measurement report to serving cell(s) (e.g., special cell, such as PCell and PSCell of the UE), the SL-measurement report to a paired UE in an SL unicast group, or other UEs. So, it is clear that an SL-measurement report corresponding to one SL-measObject may be transmitted through a (LTE/NR) Uu interface or a (LTE/NR) PC5 interface based on the target of an associated SL-measObject.

In some implementations, the UE needs to report to the serving RAN that it supports T32_SL during an SL-radio link failure (RLF) event. In an example, an Information Element, 'Timer312_SL=support', may be explicitly indicated by the UE in the UE (NR/LTE) capability information to the serving cell. It should be noted that an SL-measurement report initiated while a T312_SL starts counting/running may cover the SL-measurement report for an LTE PC5 interface (e.g., a CBR report on LTE SL resource pools) and/or an NR PC5 interface (CBR report on NR SL resource pools). In some implementations, the 'Timer312_SL=support' IE may only be applied to an SL-measurement report for an LTE PC5 interface or an NR PC5 interface. In some implementations, the 'Timer312_SL-support' IE may be applied to an SL-measurement report for both an LTE PC5 interface or an NR PC5 interface. In addition, on the UE side, the UE may not support the Timer312_SL in default setting. Thus, the UE need not to indicate Timer312_SL being not support if the UE does not support an SL-measurement report initiated after T312_SL starts counting.

TABLE 4

SL-Measurement Object with T312_SL
SL-Measurement object

| | |
|---|---|
| SL-measObject | (1) One UE may be configured with event-triggered measurement objects.<br>(2) Besides CBR reports, the mechanisms in SL-measurement report (e.g., as shown in Table 3) to (at least) one target SL-CC may also be configured in one SL-measurement object.<br>(3) To one UE, SL-measurement object may be associated with (at) least one SL component carrier, which may cover the SL component carriers on FR1 and/or FR2.<br>(4) SL-measObject may be associated with LTE PC5 interface (e.g., CBR report on LTE SL resource pools) or NR PC5 interface (CBR report on NR SL resource pools).<br>After the triggering event of one SL-measObject is fulfilled, the UE may report the SL-measurement report to the Target of SL-measurement report: |
| Target of SL-measurement report | a. In some implementations, the target of SL-measurement report may be the serving RAN (e.g., special cell, such as PCell and PSCell of the UE). So, in some implementations, one UE may be implicitly know that one SL-measObject if no additional Target information in the SL-measObject. In some other implementations, the Target of SL-measObject may be explicitly configured in the SL-measObject (e.g., PCell, PSCell, etc). In addition, the SL-measurement report would be reported through (LTE/NR) Uu interface (e.g., through uplink physical channels) if the Target of this SL-measObject is serving RAN.<br>b. In some other implementations, the target of SL-measurement report may be associated with one SL-unicast group. For example, the SL-measObject may be further associated with one Layer-2 Destination ID of the paired UE in the SL-unicast group. In addition, the SL-measurement report would be reported through Uu interface if the Target of this SL-measObject is serving RAN. In addition, the SL-measurement report would be reported through (LTE/NR) PC5 interface (e.g., through PC5 RRC signaling) if the Target of this SL-measObject is one paired UE in one SL-unicast group. In some other implementations, the SL-measurement report may be transmitted to other members in one SL-groupcast group. |
| T312_SL | The value of T312_SL may be configured with: ENUMERATED T312_SL = setup {ms0, ms50, ms100, ms200, ms300, ms400, ms500, ms1000, etc}<br>ms0 represents 0 milliseconds, ms50 represents 50 milliseconds, and ms100 represents 100 milliseconds, and so on. In some implementations, one configured T312_SL value may be associated with one or more than one SL-measurement report configuration. Also note, in some additional implementations, the UE may be instructed to release a configured T312_SL to (at) least one SL-measurement object (e.g., T312_SL = release) by receiving the instructions from the serving cell (e.g., dedicated RRC signaling). |
| UseT312_SL | One SL measurement report configuration may be associated with one UseT312_SL configuration.<br>BOOLEAN = {true, false}<br>If UseT312_SL = true. Then, the UE would start to count T312_SL while the triggering conditions of T312_SL is fulfilled.<br>a. SL radio link failure event happens, or<br>b. SL physical layer problem happens in one of the configured SL component carrier(s) in one SL-unicast group. |
| SL-measurement report delivery | UE may transmit SL-measurement report to serving cell through (LTE/NR) Uu interface or (LTE/NR) PC5 interface.<br>The SL-measurement report may include:<br>a. SL radio link failure event happens, or<br>b. SL physical layer problem happen (e.g., CBR on one FR2 SL-CC associated with one paired UE is higher than a pre-defined threshold or S-RSRP on one FR2 SL-CC is lower than a pre-defined threshold).<br>In some implementations, one UE in the RRC Inactive state may be configured and be enabled to deliver an SL-measurement report to the serving cell through (Type 1/Type 2) UL Configured Grant configuration or through a (2-step/4-step) random access procedure while the UE is staying in the RRC Inactive state.<br>While the SL physical layer problem happens to one (FR1/FR2) SL-CC within one SL-unicast group, one UE may transmit SL-measurement report to the paired UE through other active SL-CC(s) between the paired UE. |

In some of the implementations, the initiation and stop/expiry conditions of the T312_SL may be tightly coupled with the initiation and stop/expiry conditions of the T310_SL, which are summarized in Table 5.

TABLE 5

| T310_SL Counting and Expiry |
| --- |
| Implementation (SL radio link failure and T310_SL counting):<br>Start condition: In the (NR/LTE) PC5 interface, one UE in one SL-unicast group may count an SL timer, T310_SL, to zero respectively when the UE detects PHY layer related problems in (at least) one SL component carrier (e.g, when it receives N310_SL consecutive out-of-sync_SL indications (from the lower layers), which may happen periodically or in-periodically in time domain, from the lower layers (such as the Physical layer) when both of the UEs are having a PC5-RRC connection with each other in the AS layer.<br>Stop condition: the concerned UE would stop its own T310_SL in the following conditions:<br>a). While the UE receives N311_SL consecutive in-sync_SL indications (from the lower layers), which may be provided periodically or in-periodically in time domain, from the physical layer.<br>Expiry condition (RRC layer does not receive up to N311_SL consecutive in-sync_SL indications before T310_SL expires):<br>If the T310_SL expires in one UE side, the UE may release the PC5-RRC connection with the associated UE (or with the associated Layer 2 Destination ID) and then inform the released condition to the upper layer. |

Then, the initiation and stop/expiry conditions of T312_SL are summarized in Table 6.

TABLE 6

| T312_SL Initiation and Stop/Expiry Conditions |
| --- |
| Implementation (T312_SL Start and Stop/Expiry Conditions):<br>Start condition: Upon triggering an SL measurement report for which T312_SL has been configured (e.g, UseT312_SL=true) with the SL-measurement object, while T310_SL is running.<br>For example, if the UE supports T312_SL and if useT312_SL is included for this SL-measurement report configuration and if T310_SL is running:<br>   ⇨ if T312_SL is not running:<br>      =>start timer T312_SL with the value configured in the corresponding SL-measobject configuration;<br>      =>initiate the SL-measurement reporting procedure<br>Stop Condition: UE would stop a running T312_SL upon the following conditions<br>a.   Upon receiving N311_SL consecutive in-sync indications from lower layers,<br>b.   upon triggering the handover procedure or conditional handover procedure or upon initiating connection re-establishment procedure in (LTE/NR) Uu interface (e.g., while the target of the SL-measurement report is serving cell).<br>c.   T312_SL may be stopped when a sidelink radio link failure event of the target (e.g., one target Layer-2 Destination UE ID) of SL-measurement object is triggered/initiated/announced/reported. In addition, while the SL-RLF event associated with one Layer-2 Destination UE ID is announced, the stored SL-measurement result associated with the Layer-2 Destination UE ID may be released/removed.<br>d.   upon the expiry of T310_SL<br>Expiry Condition:<br>Release and dump the pending SL-measurement report procedure. |

In some implementations of the present disclosure, the UE may be configured with SL measurement objects to provide SL measurement reports to other UEs through a (LTE/NR) PC5 interface. In some of the implementations, the SL measurement objects may be event-triggered, as shown in Table 7A (Event V1a) and Table 7B (Event V2a) respectively. For example, the UE may trigger an SL-measurement report (e.g., a CBR report) when the inequality V1-1 is fulfilled in some of the present implementations. Similarly, the UE may stop transmitting the CBR report when the inequality V1-2 is fulfilled, as defined in the above Table 7A. Conversely, in some of the present implementations, the triggering event V2a may also trigger an SL-measurement report, as defined in Table 7B below. It should also be noted that the Event V1a/V2a in Table 7B may be associated with the LTE (V2X) SL or NR (V2X) SL. In addition, a UE may also be configured with the Event V1a/V2a, associated with the LTE SL and/or NR SL. In some of the present implementations, different parameters may be configured for the LTE SL and NR SL in one UE.

In some implementations, the UE may be configured with SL measurement objects to provide SL reports to serving RAN through (LTE/NR) Uu interface, as shown in Table 7C/Table 7D. In some of the implementations, the SL measurement objects may be event-triggered, as shown in Table 7C (Event V1) and Table 7D (Event V2) respectively.

TABLE 7A

CBR report (Event V1a) through NR/LTE PC5 Interface

Event V1a (The channel busy ratio is above a threshold)
UE may start a CBR report on (LTE/NR) PC5 interface
if the entering condition (Inequality V1-
1) is fulfilled.
UE may stop the CBR report on (LTE/NR) PC5 interface if the leaving condition (Inequality
V1-2) is fulfilled.
The UE may:
    1>   consider the entering condition for this event to be satisfied when condition V1-1, as
        specified below, is fulfilled;
    1>   consider the leaving condition for this event to be satisfied when condition V1-2, as
        specified below, is fulfilled;
Inequality V1-1 (Entering condition)
$Ms - Hys > Thresh$
Inequality V1-2 (Leaving condition)
$Ms + Hys < Thresh$
Ms is the measurement result of channel busy ratio of the transmission resource pool, may not
taking into account any offsets.
Hys is the hysteresis parameter for this event,
for which the value could be decided through SL-
measurement negotiation or by pre-configuration, or by base station configuration.
Thresh is the threshold parameter for this event, for which the value could be decided through
SL-measurement negotiation or by pre-configuration, or by serving base station configuration.
Ms is expressed in decimal from 0 to 1 in steps of 0.01.
Hys is expressed is in the same unit as Ms.
Thresh is expressed in the same unit as Ms.

TABLE 7B

CBR report (Event V2a) through NR/LTE PC5 interface

Event V2a (The channel busy ratio is below a threshold)
UE may start a CBR report on (LTE/NR) PC5 interface if the entering condition (Inequality V2-
1) is fulfilled.
UE may stop the CBR report on (LTE/NR) PC5 interface if the leaving condition (Inequality
V2-2) is fulfilled.
The UE may:
1>     consider the entering condition for this event to be satisfied when condition V2-1, as
        specified below, is fulfilled;
1>     consider the leaving condition for this event to be satisfied when condition V2-2, as
        specified below, is fulfilled;
Inequality V2-1 (Entering condition)
$Ms + Hys < Thresh$
Inequality V2-2 (Leaving condition)
$Ms - Hys > Thresh$

TABLE 7C

CBR Report (Event V1) through NR/LTE Uu Interface

Event V1 (The channel busy ratio is above a threshold)
UE may start a CBR report on (LTE/NR) Uu interface if the entering condition (Inequality V1-
1) is fulfilled.
UE may stop the CBR report on (LTE/NR) Uu interface if the leaving condition (Inequality V1-
2) is fulfilled.
The UE may:
1>   consider the entering condition for this event to be satisfied when condition V1-1, as
specified below, is fulfilled;
1>   consider the leaving condition for this event to be satisfied when condition V1-2, as
specified below, is fulfilled;
Inequality V1-1 (Entering condition)
$Ms - Hys > Thresh$
Inequality V1-2 (Leaving condition)
$Ms + Hys < Thresh$
The variables in the formula are defined as follows:
Ms is the measurement result of channel busy ratio of the transmission resource pool, may not
taking into account any offsets.
Hys is the hysteresis parameter for this event (i.e. hysteresis as defined within
ReportConfigEUTRA (for LTE/NR PC5 interface) or ReportConfigNR (for NR/LTE PC5
interface) for this event).

TABLE 7C-continued

CBR Report (Event V1) through NR/LTE Uu Interface

Thresh is the threshold parameter for this event (i.e. v1-Threshold as defined within ReportConfigEUTRA (for LTE/NR PC5 interface) or ReportConfigNR (for NR/LTE PC interface)).
Ms is expressed in decimal from 0 to 1 in steps of 0.01.
Hys is expressed is in the same unit as Ms.
Thresh is expressed in the same unit as Ms.

TABLE 7D

CBR report (Event V2) through NR/LTE Uu interface

Event V2 (The channel busy ratio is below a threshold)
UE may start a CBR report on (LTE/NR) Uu interface
if the entering condition (Inequality V2-
1) is fulfilled.
UE may stop the CBR report on (LTE/NR) Uu interface
if the leaving condition (Inequality V2-
2) is fulfilled.
The UE may:
    1> consider the entering condition for this event to be satisfied when condition V2-1, as
       specified below, is fulfilled;
    1> consider the leaving condition for this event to be satisfied when condition V2-2, as
       specified below, is fulfilled;
Inequality V2-1 (Entering condition)
Ms + Hys < Thresh
Inequality V2-2 (Leaving condition)
Ms − Hys > Thresh
The variables in the formula are defined as follows:
Ms is the measurement result of channel busy ratio
of the transmission resource pool, may
not taking into account any offsets.
Hys is the hysteresis parameter for this event (i.e. hysteresis as defined within ReportConfigEUTRA(for LTE/NR PC5 interface) or ReportConfigNR (for NR/LTE PC5 interface) for this event).
Thresh is the threshold parameter for this event (i.e. v2-Threshold as defined within ReportConfigEUTRA(for LTE/NR PC5 interface) or ReportConfigNR (for NR/LTE PC5 interface)).
Ms is expressed in decimal from 0 to 1 in steps of 0.01.
Hys is expressed is in the same unit as Ms.
Thresh is expressed in the same unit as Ms.

The UE may obtain the configured parameters in Tables 7A through 7D by SL pre-configuration, dedicated control signaling (e.g., RRC signaling in (LTE/NR) Uu interface)/broadcasting control signaling (e.g., system information or SI on-demand procedure) from serving Cell, or dedicated control signaling (e.g., PC5 RRC signaling)/broadcasting control signaling (e.g., MIB-SL signaling) in PC5 interface. Moreover, in some implementations, the UE may also be enabled to transmit SL-measurement report (e.g., the CBR report) to the serving cell through (Type 1/Type 2) UL configured grant(s) or through a (2-step/4-step) random access procedure while the UE is staying in RRC inactive state.

Implementation 5: Optimization of Cell (Re)Selection for SL

In the present implementation, a UE may need to perform (LTE/NR) V2X SL communication/discovery services on one or more serving frequencies (e.g., the frequency carrier that the UE has a serving cell, which may be a camped cell, Primary cell (e.g., on primary frequency), secondary cell (e.g., on secondary frequency), or Primary Secondary cell (e.g., on primary frequency) in (LTE/NR) Uu interface) and/or on one or more non-serving frequency (e.g., the frequency carrier that the UE has no serving cell in (LTE/NR) Uu interface, so the UE may have a selected cell on the non-serving frequency after cell selection/reselection procedure to implement (NR/LTE) V2X (sidelink) service on this non-serving frequency) while the V2X services are supported on these frequencies. In the present implementation, a UE may check and record validity area configurations on serving cell(s) of serving frequencies and selected cell(s) of non-serving frequencies.

In some implementations, cells in different frequencies (e.g., CC #1 and CC #2 which may be serving frequency and non-serving frequency to the UE respectively) may share the same SL resource configuration and validity area configuration. For example, the validity area for SL resource configuration may be composed by cells operates on different frequencies (which may include serving frequencies and non-serving frequencies). In some implementations, the validity area for SL resource configuration may be composed by systemInformationAreaID(s)/RAN notification area Code(s) or Tracking Area Code. Then, cells in different frequencies may also share the same systemInformationAreaID/RAN notification area Code or Tracking Area Code. Thus, in the present implementation, the UE may record the obtained SL resource configuration and the associated validity area that the UE obtains from the cells on serving frequencies and non-serving frequencies (e.g., cells in CC #1 and CC #2 respectively). For example, the UE may apply the SL resource configuration (which may cover SL resource on CC #1 and CC #2) and validity area configurations (which covers cells in CC #1 and CC #2), which are obtained from the cells of non-serving frequency(ies), when the UE is implementing (NR/LTE) V2X (sidelink) service on CC #1. In addition, if the validity area is represented by systemInformationAreaID and the SL resource configuration is broadcast in system information (or the system information may be delivered through SI on-demand procedure), then the UE may apply the stored SL resource configuration associated with the systemInformationAreaID without reading the rest of system information about SL resource configuration (or the UE may not initiate random access procedure to request the system information to obtain the SL resource configuration), no matter the cell (re)selection is implementing on a serving frequency or a non-serving frequency.

It should be noted that the stored validity area and the associated SL resource configuration may be applied to the fallback mechanisms described in Implementation 2 above. In the fallback implementation, a UE may still keep the stored SL resource configuration and the validity area configuration while the UE camps or selects a cell (in one concerned frequency. e.g., CC #1) which does not belong to the stored validity area. The stored validity area and SL resource configuration may still be applicable in the cells operating on other SL frequencies (e.g., CC #2). In some implementations, the UE may release or remove one stored validity area and associated SL resource configuration if none of the serving cell (serving frequency)/selected cell (non-serving frequency) on all of the frequencies (which the UE is implementing SL operation) belongs to the stored validity area. In some implementations, a timer may be further configured with the validity area configuration. The timer (>0) may be triggered after the UE finds out that none of the serving cell (serving frequency) and selected cell (non-serving frequency) on all of the frequencies (which the UE is implementing SL operations) belongs to the validity area. Then, the UE may release the stored validity area (and the associated SL resource configuration) after the timer expires. In some additional implementations, it may be up to specific UE implementations to decide when to release/remove an invalid SL resource configuration.

Figure 6:
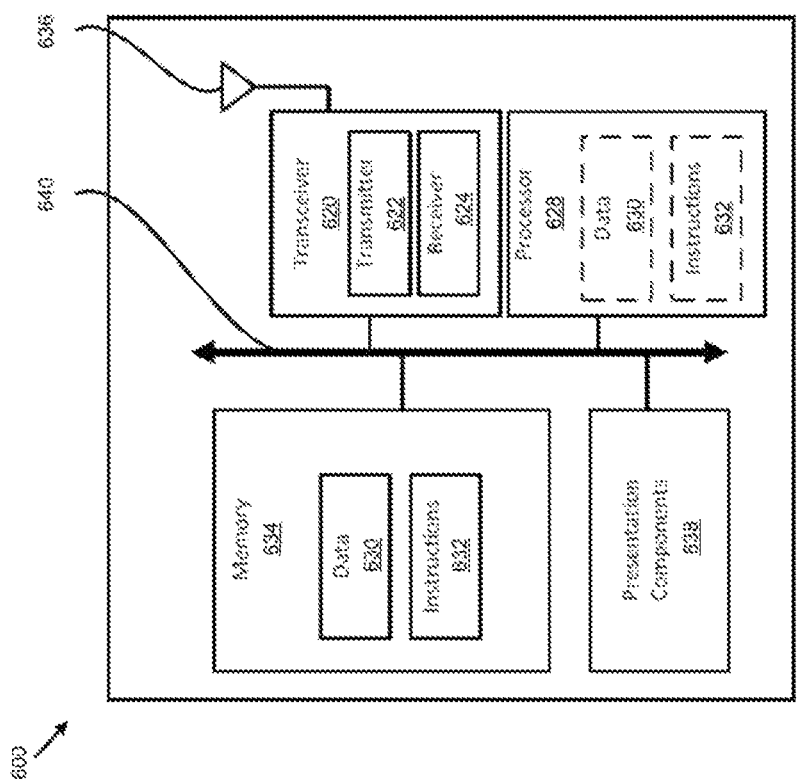
FIG. 6 is a block diagram illustrating a node for wireless communication in accordance with various aspects of the present disclosure.

FIG. 6 is a block diagram illustrating a node 600 for wireless communication according to the present disclosure. As illustrated in FIG. 6, a node 600 may include a transceiver 620, a processor 628, a memory 634, one or more presentation components 638, and at least one antenna 636. The node 600 may also include a radio frequency (RF) spectrum band module, a BS communications module, a network communications module, and a system communications management module, Input/Output (I/O) ports, I/O components, and a power supply (not illustrated in FIG. 6).

Each of the components may directly or indirectly communicate with each other over one or more buses 640. The node 600 may be a UE or a BS that performs various functions disclosed with reference to FIGS. 1 through 5.

The transceiver 620 has a transmitter 622 (e.g., transmitting/transmission circuitry) and a receiver 624 (e.g., receiving/reception circuitry) and may be configured to transmit and/or receive time and/or frequency resource partitioning information. The transceiver 620 may be configured to transmit in different types of subframes and slots including but not limited to usable, non-usable and flexibly usable subframes and slot formats. The transceiver 620 may be configured to receive data and control channels.

The node 600 may include a variety of computer-readable media. Computer-readable media may be any available media that may be accessed by the node 600 and include both volatile and non-volatile media, and removable and non-removable media.

The computer-readable media may include computer storage media and communication media. Computer storage media may include both volatile and non-volatile media, and removable and non-removable media implemented in any method or technology for storage of information such as computer-readable instructions, data structures, program modules or data.

Computer storage media may include RAM, ROM, EPROM, EEPROM, flash memory or other memory technology, CD-ROM, Digital Versatile Disks (DVD) or other optical disk storage, magnetic cassettes, magnetic tape, magnetic disk storage or other magnetic storage devices. Computer storage media may not include a propagated data signal. Communication media may typically embody computer-readable instructions, data structures, program modules or other data in a modulated data signal such as a carrier wave or other transport mechanism and include any information delivery media.

The term "modulated data signal" means a signal that has one or more of its characteristics set or changed in such a manner as to encode information in the signal. Communication media may include wired media such as a wired network or direct-wired connection, and wireless media such as acoustic, RF, infrared and other wireless media. Combinations of any of the previously listed components should also be included within the scope of computer-readable media.

The memory 634 may include computer-storage media in the form of volatile and/or non-volatile memory. The memory 634 may be removable, non-removable, or a combination thereof. Example memory may include solid-state memory, hard drives, optical-disc drives, etc. As illustrated in FIG. 6, the memory 634 may store computer-readable, computer-executable instructions 632 (e.g., software codes) that are configured to cause the processor 628 to perform various functions disclosed herein, for example, with reference to FIGS. 1 through 5. Alternatively, the instructions 632 may not be directly executable by the processor 628 but be configured to cause the node 600 (e.g., when compiled and executed) to perform various functions disclosed herein.

The processor 628 (e.g., having processing circuitry) may include an intelligent hardware device, e.g., a Central Processing Unit (CPU), a microcontroller, an ASIC, etc. The processor 628 may include memory. The processor 628 may process the data 630 and the instructions 632 received from the memory 634, and information transmitted and received via the transceiver 620, the baseband communications module, and/or the network communications module. The processor 628 may also process information to be sent to the transceiver 620 for transmission via the antenna 636 to the network communications module for transmission to a core network.

One or more presentation components 638 may present data indications to a person or another device. Examples of presentation components 638 may include a display device, a speaker, a printing component, and a vibrating component, etc.

In some implementations of the present disclosure, configurations for NR SL/LTE V2X SL synchronization rules are utilized when multiple SL CCs are configured to support (NR/LTE) (V2X) SL operations among UEs.

In some implementations of the present disclosure, information regarding SL CCs associated with NR (e.g., for NR sidelink communication) and/or LTE RATs (e.g., for (LTE) V2X sidelink communication) is indicated to the UE (e.g., through an Uu interface).

In some implementations of the present disclosure, the associations between SL CCs and the associated RATs may be network-specific (e.g., PLMN-specific or NPN-specific).

In some implementations of the present disclosure, SL CCs with associated NR SL/LTE V2X SL synchronization rules are indicated.

In some implementations of the present disclosure, the associations between SL CCs and the NR SL/LTE V2X SL synchronization rules may be PLMN-specific/NPN-specific.

In some implementations of the present disclosure, the associations between SL CCs and the NR SL/LTE V2X SL synchronization rules may be valid within a defined validity area.

In some implementations of the present disclosure, the above-mentioned indications and/or association rules may be pre-specified in technical specifications or pre-defined in the USIM or memory module in the UE so that the UE is able to interpret and apply the above-mentioned indications and/or association rules.

In view of the disclosure, it is obvious that various techniques may be used for implementing the concepts in the present disclosure without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed and many rearrangements, modifications, and substitutions are possible without departing from the scope of the present disclosure.

What is claimed is:

1. A user equipment (UE), comprising:
   one or more non-transitory computer-readable media having computer-executable instructions embodied thereon;
   at least one processor coupled to the one or more non-transitory computer-readable media, and configured to execute the computer-executable instructions to:
   receive, through a serving cell of a first Radio Access Technology (RAT), a sidelink resource configuration of a second RAT;
   determine first validity area information associated with the first RAT and second validity area information associated with the second RAT, the first validity area information and the second validity area information being associated with different frequency carriers;
   identify a validity area of the sidelink resource configuration based on the first validity area information and the second validity area information.

2. The UE of claim 1, wherein the at least one processor is further configured to execute the computer-executable instructions to:
   access a sidelink resource associated with the validity area after the validity area is identified as valid.

3. The UE of claim 1, wherein the first validity area information is associated with a first Public Land Mobile Network (PLMN) identity (PLMNidentity) in a PLMNidentity list or a first Non-Public Network (NPN) identity (NPNidentity) in a NPNidentity list, wherein the PLMNidentity list and the NPNidentity list are broadcast by the serving cell.

4. The UE of claim 1, wherein the second validity area information is associated with at least one of one or more SL transmission resource pools, one or more SL reception resource pools, and one or more exceptional transmission resource pools.

5. The UE of claim 1, wherein the first RAT is a $5^{th}$ Generation New Radio (5G NR) RAT.

6. The UE of claim 1, wherein the sidelink resource configuration of the second RAT is for Long Term Evolution (LTE) Vehicle to Everything (V2X) sidelink communication associated with an Evolved Universal Terrestrial Radio Access (E-UTRA) RAT.

7. The UE of claim 1, wherein the sidelink resource configuration of the second RAT is received through system information broadcast by the serving cell of the first RAT.

8. The UE of claim 1, wherein the validity area of the sidelink resource configuration is composed of at least one system information area identifier (systemInformationAreaID) broadcast by the serving cell of the first RAT.

9. The UE of claim 8, wherein a first validity area of the first RAT is composed by the cell identity of the serving cell of the first RAT, when the sidelink resource configuration is not indicated by the systemInformationAreaID broadcast by the serving cell or the systemInformationAreaID is absent from the system information broadcast by the serving cell.

10. The UE of claim 1, wherein the sidelink resource configuration associated with the validity area is invalidated by the UE after the UE moves out of either a first validity area associated with the first validity area information or a second validity area associated with the second validity area information.

11. A method by a user equipment (UE), the method comprising:
    receiving, through a serving cell of a first Radio Access Technology (RAT), a sidelink resource configuration of a second RAT;
    determining first validity area information associated with the first RAT and second validity area information associated with the second RAT, the first validity area information and the second validity area information being associated with different frequency carriers;
    identifying a validity area of the sidelink resource configuration based on the first validity area information and the second validity area information.

12. The method of claim 11, further comprising:
    accessing a sidelink resource associated with the validity area after the validity area is identified as valid.

13. The method of claim 11, wherein the first validity area information is associated with a first Public Land Mobile Network (PLMN) identity (PLMNidentity) in a PLMNidentity list or a first Non-Public Network (NPN) identity (NPNidentity) in a NPNidentity list, wherein the PLMNidentity list and the NPNidentity list are broadcast by the serving cell.

14. The method of claim 11, wherein the second validity area information is associated with at least one of one or more SL transmission resource pools, one or more SL reception resource pools, and one or more exceptional transmission resource pools.

15. The method of claim 11, wherein the first RAT is a $5^{th}$ Generation New Radio (5G NR) RAT.

16. The method of claim 11, the sidelink resource configuration of the second RAT is for Long Term Evolution (LTE) Vehicle to Everything (V2X) sidelink communication associated with an Evolved Universal Terrestrial Radio Access (E-UTRA) RAT.

17. The method of claim 11, wherein the sidelink resource configuration of the second RAT is received through system information broadcast by the serving cell of the first RAT.

18. The method of claim 11, wherein the validity area of the sidelink resource configuration is composed of at least one system information area identifier (systemInformationAreaID) broadcast by the serving cell of the first RAT.

19. The method of claim 18, wherein a first validity area of the first RAT is composed by the cell identity of the serving cell of the first RAT, when the sidelink resource configuration is not indicated by the systemInformationAreaID broadcast by the serving cell or the systemInformationAreaID is absent from the system information broadcast by the serving cell.

20. The method of claim 11, wherein the sidelink resource configuration associated with the validity area is invalidated by the UE after the UE moves out of either a first validity area associated with the first validity area information or a second validity area associated with the second validity area information.

\* \* \* \* \*